(12) United States Patent
Bronstein et al.

(10) Patent No.: US 8,373,716 B2
(45) Date of Patent: Feb. 12, 2013

(54) PARALLEL APPROXIMATION OF DISTANCE MAPS

(75) Inventors: Alexander Bronstein, Karmiel (IL); Michael Bronstein, Karmeil (IL); Yohai Devir, Haifa (IL); Ofir Weber, Raanana (IL); Ron Kimmel, Haifa (IL)

(73) Assignee: Intel Benelux B.V. (BE)

( * ) Notice: Subject to any disclaimer, the term of this patent is extended or adjusted under 35 U.S.C. 154(b) by 467 days.

(21) Appl. No.: 12/527,265

(22) PCT Filed: Feb. 14, 2008

(86) PCT No.: PCT/IL2008/000195
§ 371 (c)(1),
(2), (4) Date: Aug. 27, 2009

(87) PCT Pub. No.: WO2008/099400
PCT Pub. Date: Aug. 21, 2008

(65) Prior Publication Data
US 2010/0119120 A1    May 13, 2010

Related U.S. Application Data

(60) Provisional application No. 60/889,832, filed on Feb. 14, 2007.

(51) Int. Cl.
*G09G 5/00* (2006.01)

(52) U.S. Cl. ........ 345/581; 345/419; 345/473; 345/621; 382/118; 382/154; 382/203

(58) Field of Classification Search .................. 382/238; 702/19; 345/419
See application file for complete search history.

(56) References Cited

U.S. PATENT DOCUMENTS

| | | | |
|---|---|---|---|
| 7,447,344 B2 * | 11/2008 | Pichon et al. | 382/130 |
| 2001/0009974 A1 * | 7/2001 | Reisfeld | 600/407 |
| 2005/0133339 A1 * | 6/2005 | Mukai | 194/207 |
| 2005/0180613 A1 * | 8/2005 | Bronstein et al. | 382/118 |
| 2006/0052943 A1 * | 3/2006 | Ramani et al. | 702/19 |
| 2006/0066612 A1 * | 3/2006 | Yang et al. | 345/419 |
| 2008/0049991 A1 * | 2/2008 | Gering | 382/128 |
| 2008/0063285 A1 * | 3/2008 | Porikli et al. | 382/190 |
| 2008/0181519 A1 * | 7/2008 | Porikli | 382/238 |
| 2009/0115782 A1 * | 5/2009 | Irons et al. | 345/420 |

* cited by examiner

*Primary Examiner* — Xiao M. Wu
*Assistant Examiner* — Phi Hoang
(74) *Attorney, Agent, or Firm* — Trop, Pruner & Hu, P.C.

(57) ABSTRACT

Method for parallel approximation of distance maps on a discrete representation of a manifold, the method comprising: for at least one Euclidean grid applied on the discrete representation of a manifold, iterating over rows of the Euclidean grid in a first direction, and for each row currently visited during the iterating in the first direction, calculating a distance value for each single cell of the currently visited row in parallel, wherein the calculating is carried out according to a predefined approximation rule, using a distance value calculated for each one of respective cells of a row visited immediately before the currently visited row, wherein the cells of the row visited before the currently visited row are adjacent to the single cell in the Euclidean grid.

24 Claims, 14 Drawing Sheets

PARALLEL APPROXIMATION OF DISTANCE MAPS

CROSS-REFERENCE TO RELATED APPLICATIONS

This application is a National Stage of International Application No. PCT/IL2008/000195, filed Feb. 14, 2008, which claims the benefit of U.S. Provisional Patent Application No. 60/889,832, filed Feb. 14, 2007, both of which are incorporated by reference herein.

FIELD AND BACKGROUND OF THE INVENTION

The present invention relates to computer graphics, geometry processing, image processing, computer vision and pattern recognition, and more particularly, but not exclusively, to approximation of distance maps used in applications therein.

Distance maps are often used for approximation of geodesic distances on manifolds, where manifold refers to an n-dimensional space with given local metric properties. Examples of manifold include images, curved surfaces, three-dimensional volumes (say, in computer games, or for collision detection, as known in the art), etc.

Approximation of geodesic distances on manifolds is an important computational geometry problem, appearing in many applications in the fields of computer graphics, geometry processing, image processing, computer vision and pattern recognition.

Examples include: Surface segmentation and editing methods which are based on cutting the surface along geodesic paths, Parameterization and texture mapping, Collision detection, Correspondence and matching, Shape classification, Mesh Deformation and Editing, Farthest point sampling, Path planning and navigation.

As known in the art, the problem of distance map approximation may be formulated as the viscosity solution of the eikonal equation. Eikonal equation governs the behavior of wavefront propagation from the source point through a medium with given properties. The solution of the eikonal equation demonstrates that the wavefront traverse the path between two points, which takes the least time, which is equivalent to choosing the shortest path available between the two points.

A widely used method for approximation of distance is known as Fast Marching.

The main idea of the fast marching method is to simulate a wave front advancing from a set of source points positioned in a Euclidean grid applied on a discrete representation of a manifold.

The propagating front may be thought of as a "prairie fire" evolution towards directions where the grid is not yet "burnt out". At time t=0, the fire starts at the source points, and the Fast Marching method's update scheme is used to compute the time values t for each grid point the advancing "fire front" reaches, as described in further detail hereinbelow.

For finding the shortest paths in a manifold, Fast Marching maintains a set of fixed grid points, for which the time of arrival is already known, and a priority queue of all other grid points sorted by their times of wave front arrival.

Reference is now made to FIG. 1, which illustrates an update step, according to prior art.

The basic operation of the fast marching method is the update step, using the Fast Marching update scheme. The Fast Marching update scheme is used to calculate the time of arrival of the wave front to a first grid point ($x_0$) based on the previously calculated times of arrival of the wave front to grid points ($x_1$, $x_2$) immediately adjacent to the first grid points ($x_0$), which comprises the distance value for the grid point ($x_0$).

As illustrated using FIG. 1, fast marching method's original update scheme is based on simulating a planar wave front propagating inside the triangle. Distance values of two supporting grid points ($x_1$, $x_2$) on the grid allow approximation of the front direction.

Currently, the fast marching method is also generalized to arbitrary triangulated surfaces, unstructured meshes, implicit unorganized surfaces, and parametric surfaces.

SUMMARY OF THE INVENTION

According to one aspect of the present invention there is provided a method for parallel approximation of distance maps on a discrete representation of a manifold.

The method comprises: for at least one Euclidean grid applied on the discrete representation of a manifold, iterating over rows of the Euclidean grid in a first direction.

The method further comprises, for each row currently visited during the iterating in the first direction, calculating a distance value for each single cell of the currently visited row in parallel, wherein the calculating is carried out according to a predefined approximation rule, using a distance value calculated for each one of respective cells of a row visited immediately before the currently visited row, wherein the cells of the row visited before the currently visited row are adjacent to the single cell in the Euclidean grid.

According to a second aspect of the present invention there is provided an Apparatus for parallel approximation of distance maps on a discrete representation of a manifold, the apparatus comprising: an iterator, configured for at least one Euclidean grid applied on the discrete representation of a manifold, to iterate over rows of the Euclidean grid in a first direction.

The apparatus further comprises a distance value calculator, associated with the iterator, and configured for each row currently visited during the iterating in the first direction, to calculate a distance value for each single cell of the currently visited row in parallel, wherein the calculating is carried out according to a predefined approximation rule using a distance value calculated for each one of respective cells of a row visited immediately before the currently visited row, wherein the cells of the row visited before the currently visited row are adjacent to the single cell in the Euclidean grid.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention.

Figure 1:
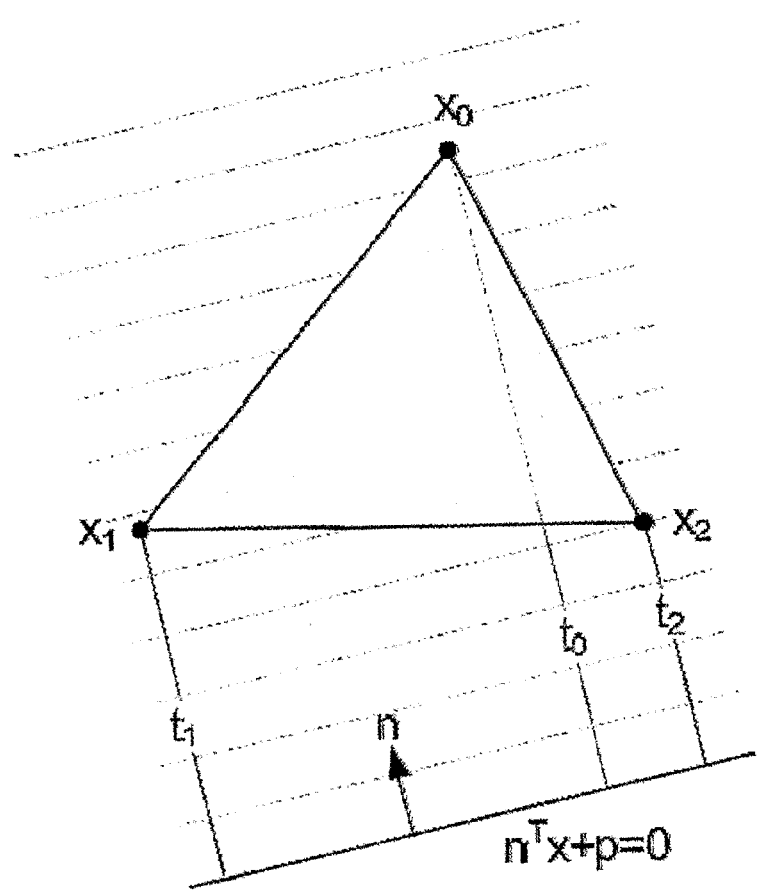
Figure 2A:
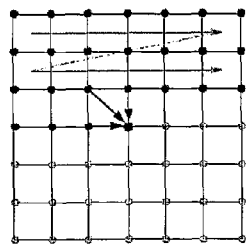
Figure 2B:
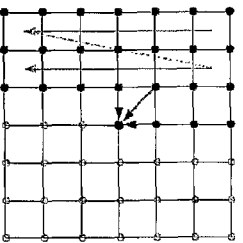
Figure 2C:
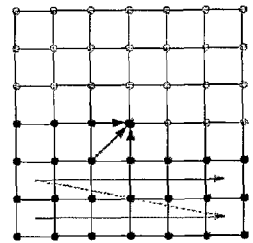
Figure 2D:
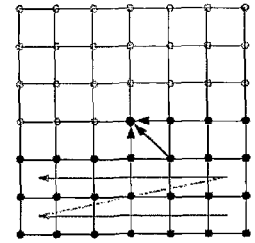
Figure 2E:
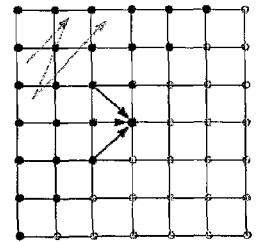
Figure 2F:
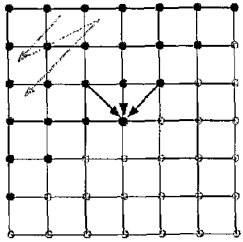
Figure 2G:
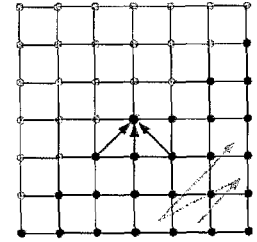
Figure 2H:
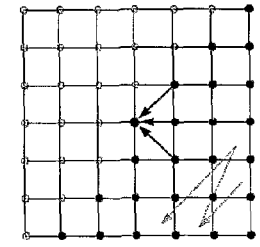

The description taken with the drawings making apparent to those skilled in the art how the several forms of the invention may be embodied in practice.

In the drawings:

FIG. 1 is a simplified diagram illustrating an update step, according to prior art.

FIG. 2 is a simplified diagram illustrating a simplified exemplary updates of grid points, according to a preferred embodiment of the present invention.

Figure 3A:
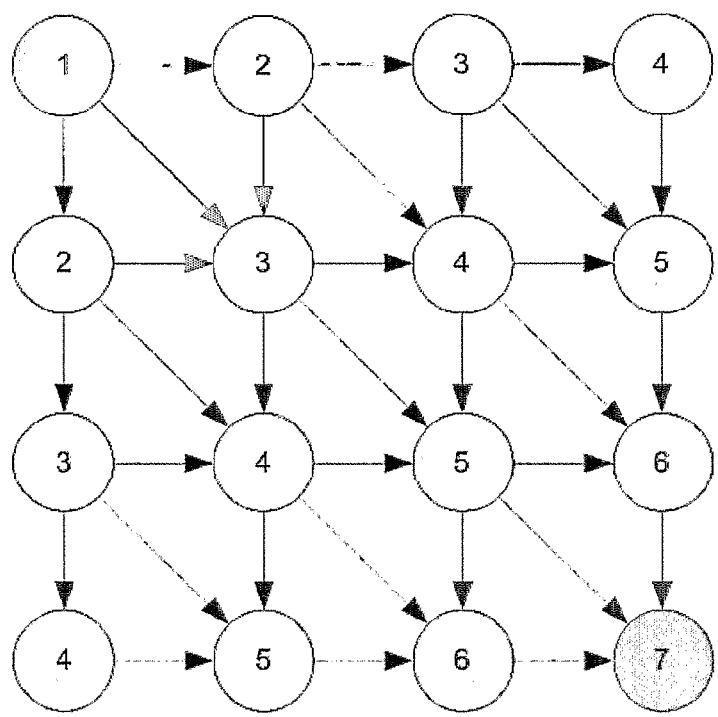

FIG. 3a is a simplified diagram illustrating a first traversal of grid points, according to a preferred embodiment of the present invention.

Figure 3B:
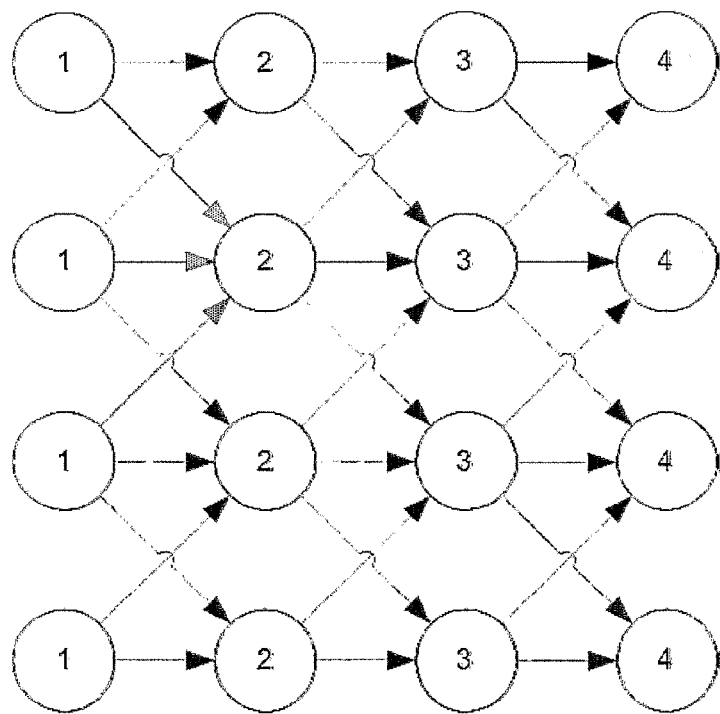

FIG. 3b is a simplified diagram illustrating a second traversal of grid points, according to a preferred embodiment of the present invention.

Figure 4:
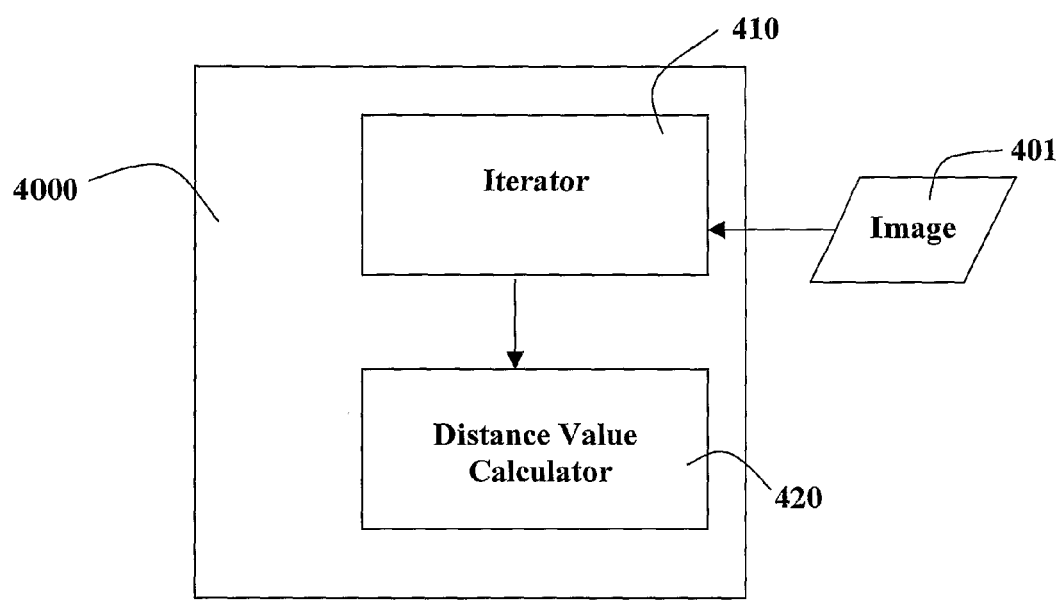

FIG. 4 is a block diagram illustrating a first apparatus for parallel approximation of distance maps on a discrete representation of a manifold, according to a preferred embodiment of the present invention.

Figure 5:
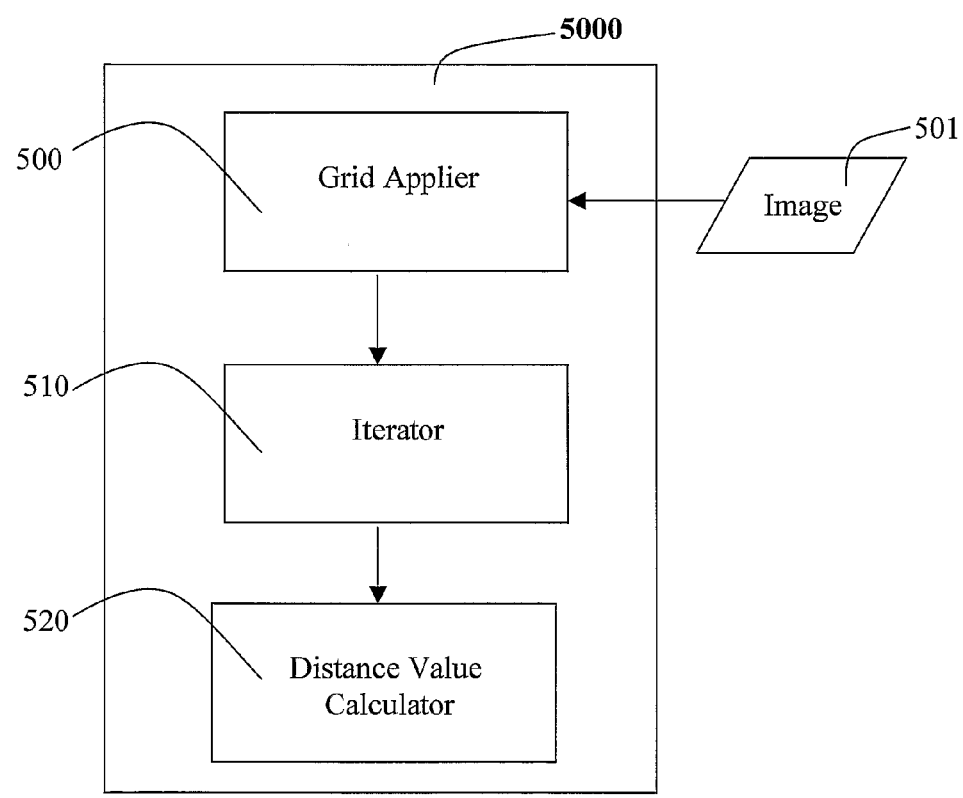

FIG. 5 is a block diagram illustrating a second apparatus for parallel approximation of distance maps on a discrete representation of a manifold, according to a preferred embodiment of the present invention.

Figure 6:
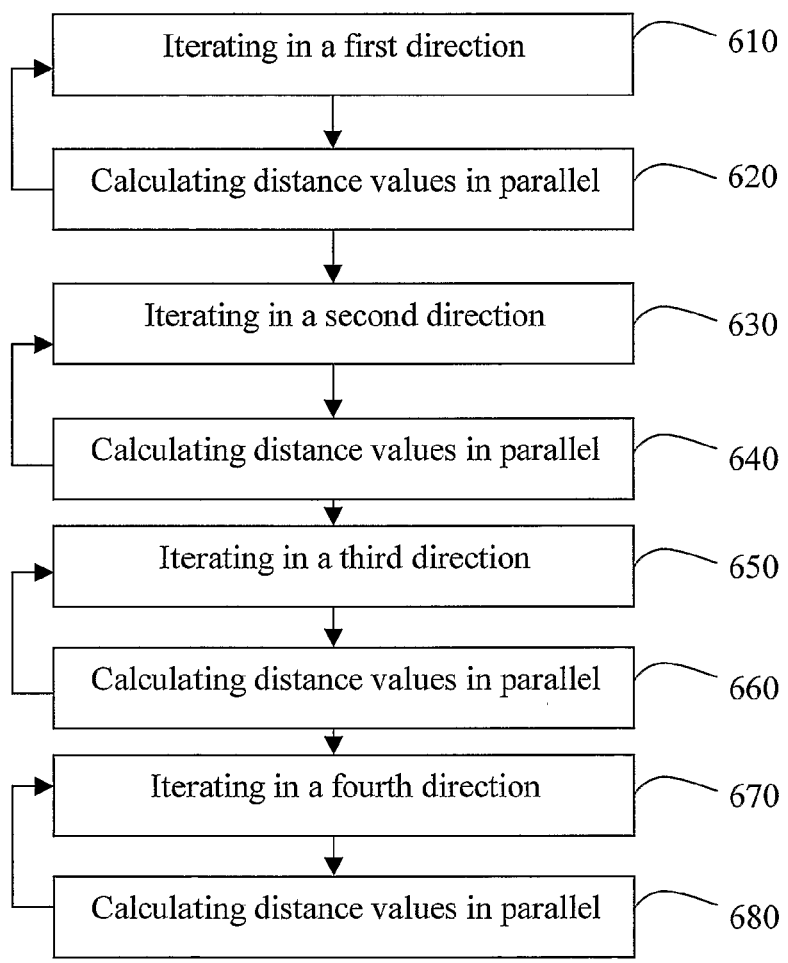

FIG. 6 is a flowchart illustrating a first method for parallel approximation of distance maps on a discrete representation of a manifold, according to a preferred embodiment of the present invention.

Figure 7:
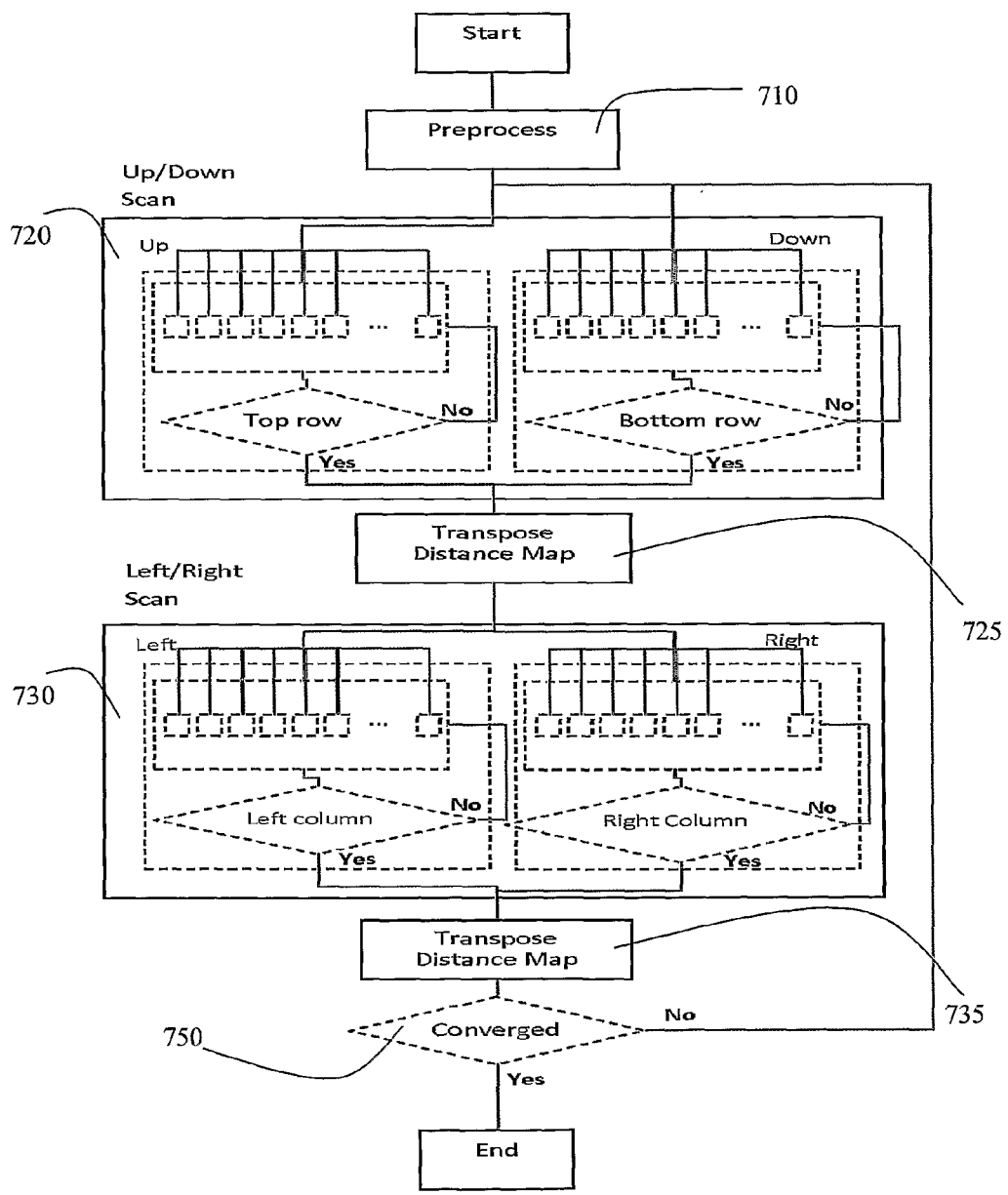

FIG. 7 is a flowchart illustrating a second method for parallel approximation of distance maps on a discrete representation of a manifold, according to a preferred embodiment of the present invention.

Figure 8:
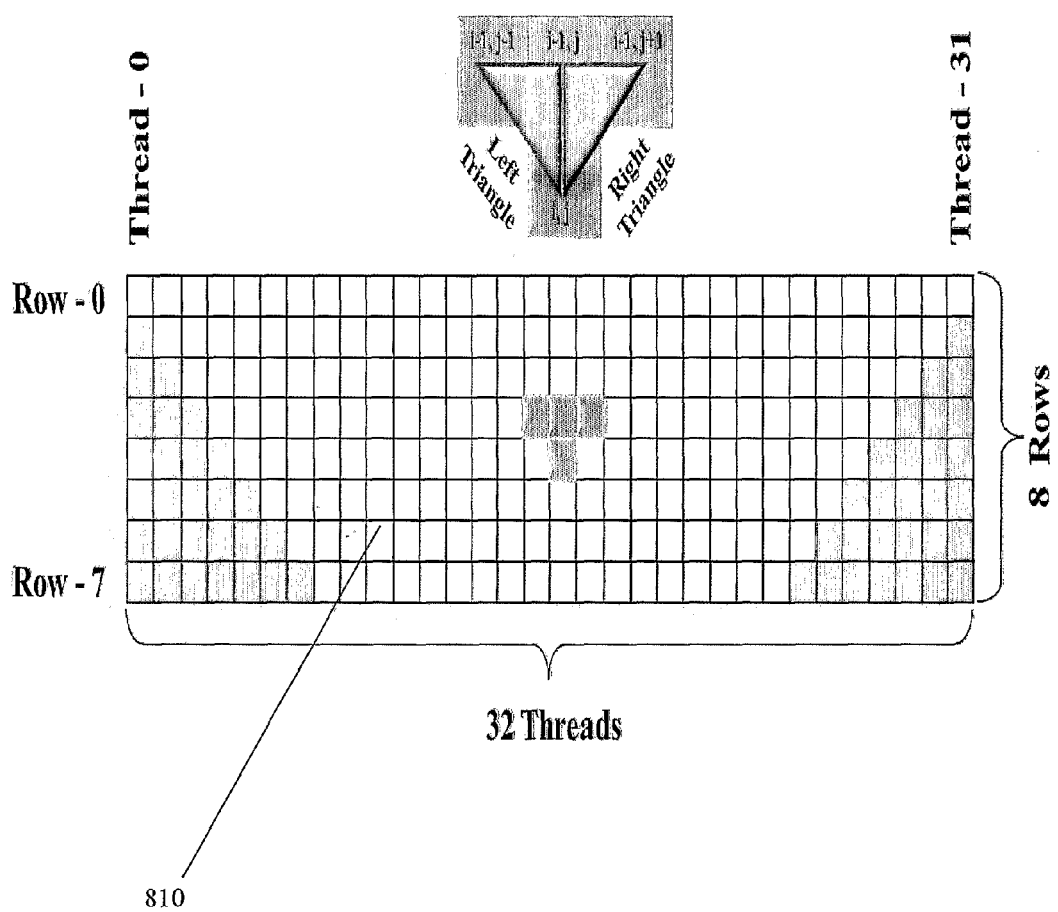

FIG. 8 is a simplified block diagram illustrating a first exemplary implementation of a method on a GPU, according to a preferred embodiment of the present invention.

Figure 9:
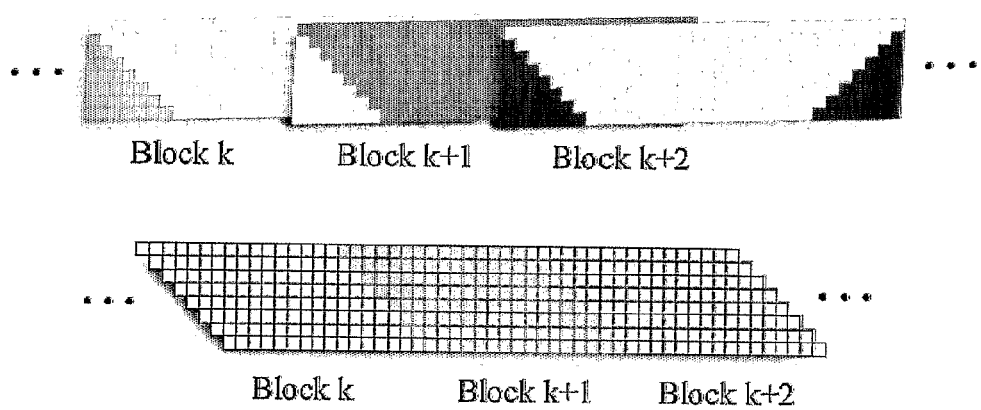

FIG. 9 is a simplified block diagram illustrating a second exemplary implementation of a method on a GPU, according to a preferred embodiment of the present invention.

Figure 10:
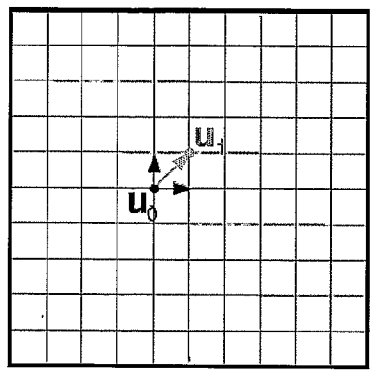
Figure 10:
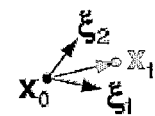

FIG. 10 is a simplified diagram illustrating coordinates in the parameterization domain, according to a preferred embodiment of the present invention.

Figure 11:
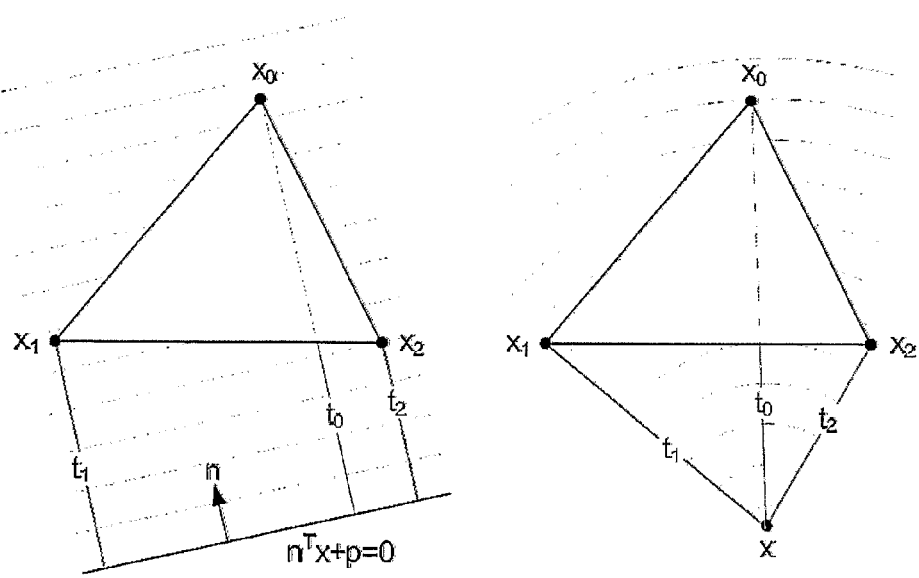

FIG. 11 is a simplified diagram illustrating a first exemplary update scheme, according to a preferred embodiment of the present invention.

Figure 12:
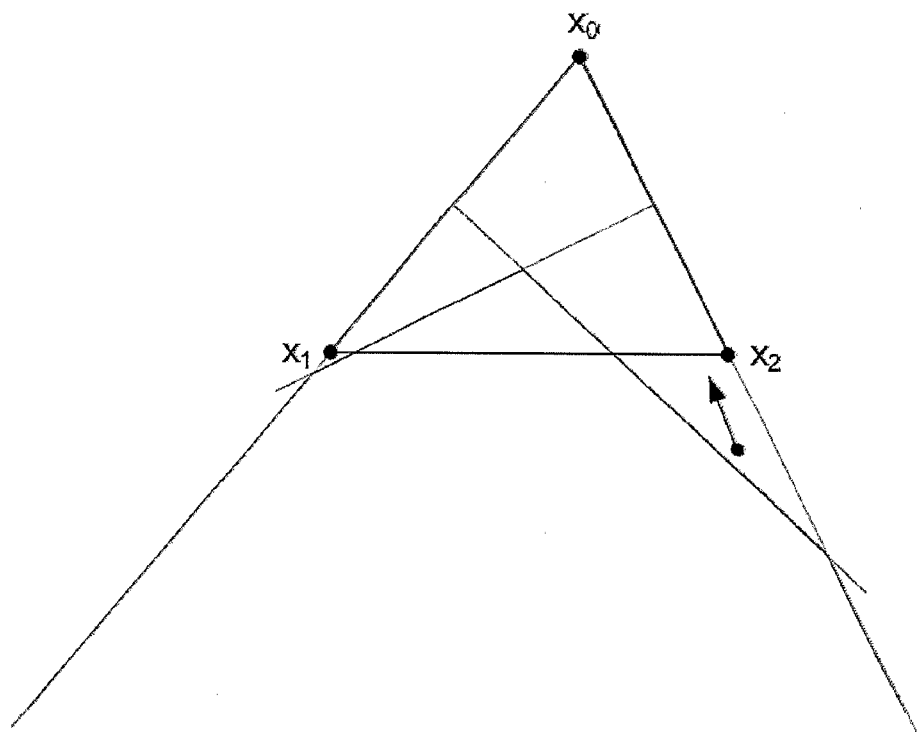

FIG. 12 is a simplified diagram illustrating a second update scheme, according to a preferred embodiment of the present invention.

Figure 13:
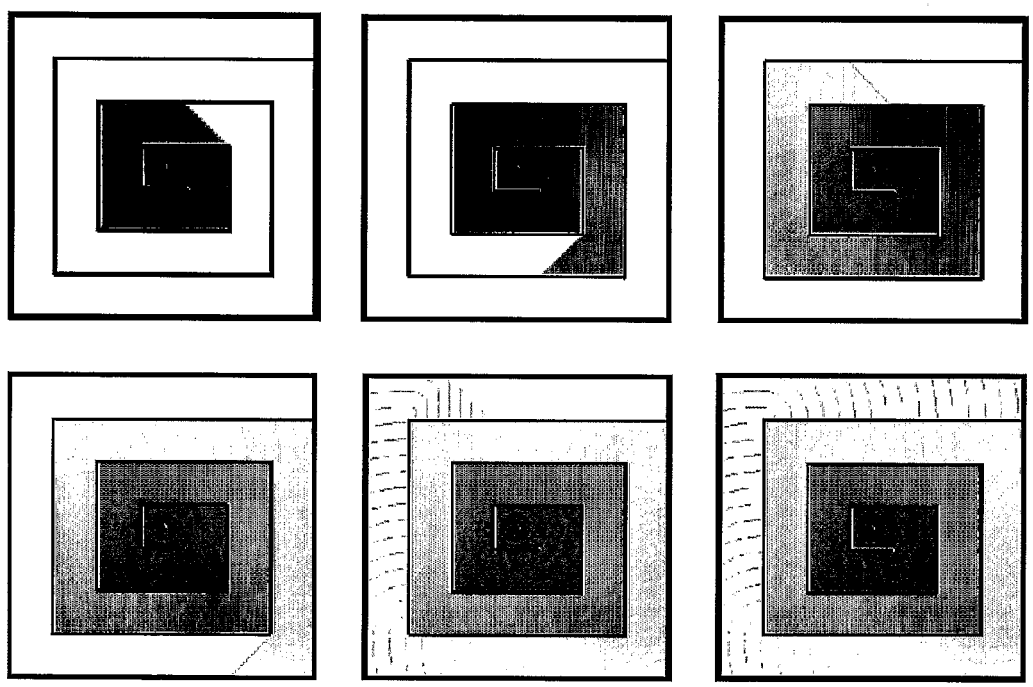

FIG. 13 is a simplified chart illustrating an exemplary calculation of a distance map on a maze surface, according to a preferred embodiment of the present invention.

Figure 14:
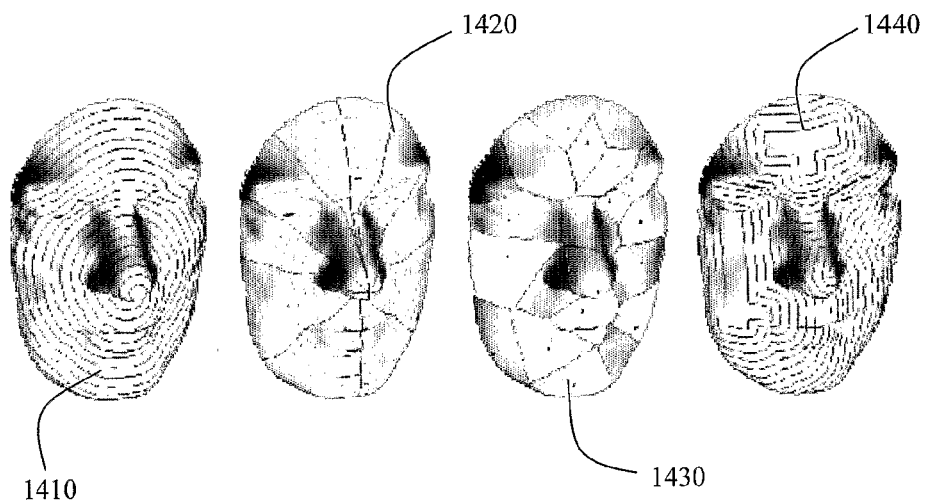

FIG. 14 is a simplified chart illustrating exemplary calculations of a distance maps on a human face manifold, according to a preferred embodiment of the present invention.

Figure 15:
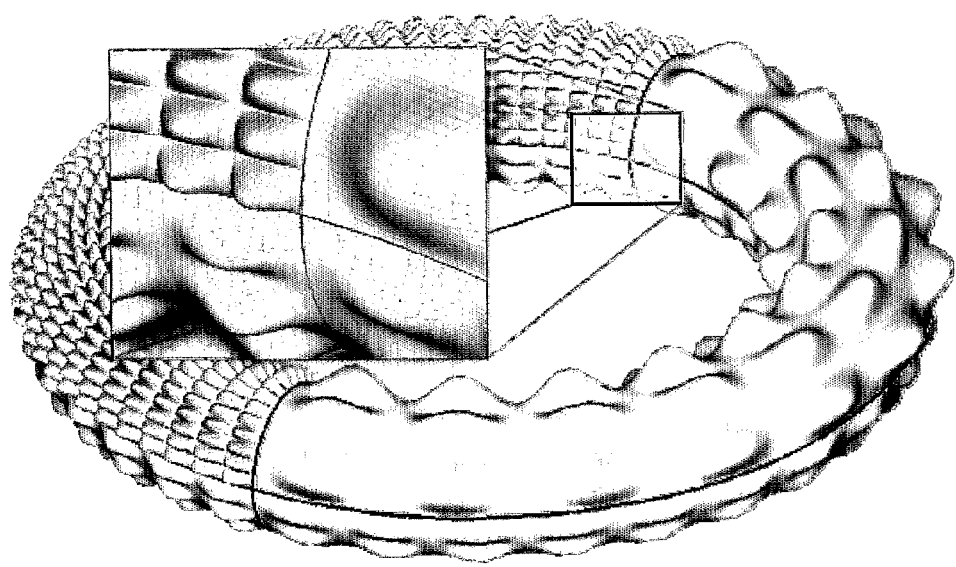

FIG. 15 is a simplified chart illustrating an exemplary calculation of a distance map using four grids, according to a preferred embodiment of the present invention.

Figure 16:
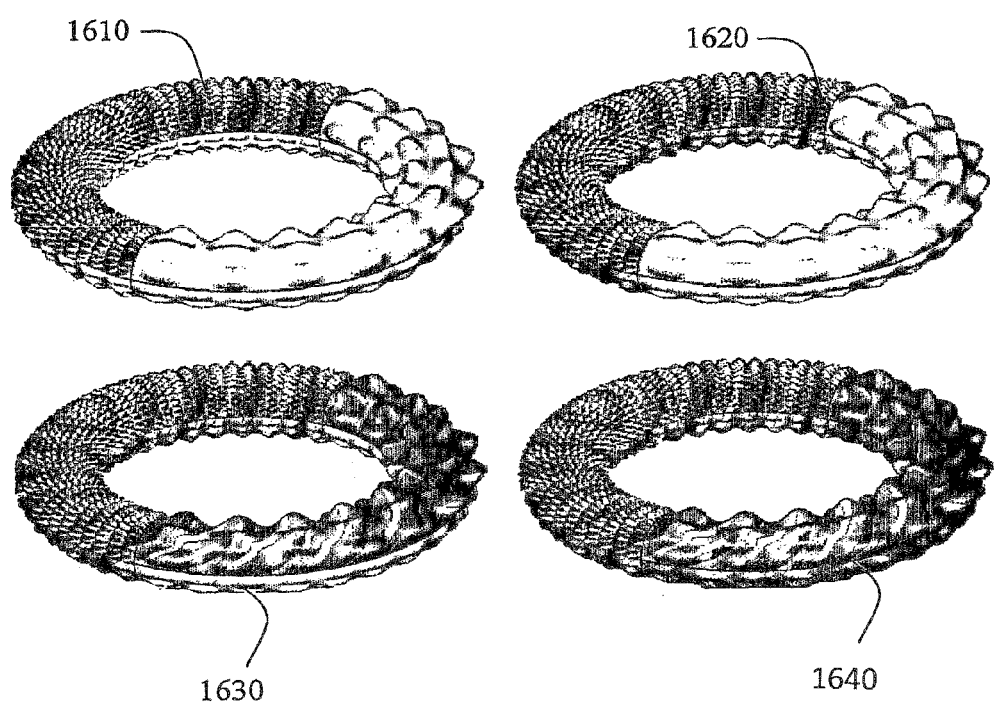

FIG. 16 is a simplified chart illustrating stages of an exemplary calculation of a distance map using four grids, according to a preferred embodiment of the present invention.

DESCRIPTION OF THE PREFERRED EMBODIMENTS

The present embodiments comprise a method and apparatus for parallel approximation of distance maps on a discrete representation of a manifold.

Approximation of geodesic distances on manifolds is an important computational geometry problem, appearing in many applications in the fields of computer graphics, geometry processing, image processing, computer vision and pattern recognition.

Traditional fast marching method is inherently sequential, thus allowing no parallelization.

A computing device equipped with a set of parallel computation units may be used to approximate distance maps on a discrete representation of a manifold, using a Euclidean grid applied on the manifold. However, using traditional fast marching, the device fails to efficiently use the set of parallel computation units.

With traditional fast marching, grid points are visited in an order, which depends on the shape of the propagating wave front. That is to say that the visiting order is data-dependent. The data dependency of the visiting order results in an irregular memory access that is unlikely to utilize caching capacities available on computers in an efficient manner.

Preferred embodiments of the present invention aim at introducing parallelization into the fast marching method, thereby providing a method and apparatus for parallel approximation of distance maps on a discrete representation of a manifold, say utilizing a computing device equipped with a set of parallel computation units, as described in further detail hereinbelow.

The principles and operation of a method and an apparatus according to the present invention may be better understood with reference to the drawings and accompanying description.

Reference is now made to FIG. 2, which is a simplified diagram illustrating a simplified exemplary updates of grid points, according to a preferred embodiment of the present invention.

According to a preferred embodiment of the present invention, an Euclidean grid applied on a discrete representation of a manifold may be traversed using a raster-like scan in a specific direction, say down (i.e. row by row, from top to bottom) and to the left (through the points of each row).

A raster-like scan traversal has linear complexity in the grid size, and is characterized by regular access to computer memory, which increases the efficiency of caching on the computer used for parallel approximation of distance maps an manifold implemented on the computer.

Since the order of visiting of the grid points is independent of the data and is known in advance, one can use the pre-caching mechanism, supported in many modern processors. In addition the raster-like scan can be efficiently parallelized as described in further detail hereinbelow.

The update of the grid points (i.e. the calculation of the distance values for the grid points) is based on the update scheme of the Fast Marching method, described in further detail hereinbelow.

As known in the art, a directional raster-like scan, based on the update scheme of the Fast Marching method, and carried out over an Euclidean grid may cover up to 135° of 360° of the grid, i.e up to 75% of the grid. Typically, no more than 90° of the 360° (i.e 25%) are unique. That is to say that no more than 25% of the grid points updated during a certain directional raster-like scan do not overlap with any scan in other directions.

Since each directed raster like scan covers only 90° of 360° of the grid (i.e. 25%), the update of a point in each directed raster-like scan on the grid is done only using the triangles associated with the non-overlapping direction.

For example, if the eight-neighbor grid connectivity is used, only two triangles formed by three neighbors are used in the update, as illustrated in FIG. 2, in the first row. Consequently, there arises the need to carry out the raster-like scan in four directions.

In a first direction, a raster-like scan is carried out in a bottom-right direction (a). Each grid point's distance value is carried out using already visited adjacent grid points. The already visited grid points are positioned upper or left to the grid point of the distance value.

Similarly, a raster-like scan is carried out in a bottom-left direction (b). Each grid point's distance value is carried out using already visited adjacent grid points positioned upper or right to the grid point of the distance value.

A third direction raster-like scan is carried out in an up-right direction (c). Each grid point's distance value is carried out using adjacent grid points positioned down or left to the grid point of the distance value.

A fourth raster-like scan (d) is also carried out in an up-left direction. Each grid point's distance value is carried out using adjacent grid points positioned down or right to the grid point of the distance value.

It is further noted that the surfaces represented in the discrete representation of a manifold may be curved (say a mountain terrain). Consequently, points on the Euclidean grid applied on the discrete representation of the manifold are not necessarily connected by straight lines. That is to say that the four raster-like scans may have to be repeated several times in order to produce a consistent distance map.

Reference is now made FIG. 3a, which is a simplified diagram illustrating a first traversal of grid points, using a raster-like scan, according to a preferred embodiment of the present invention.

The structure of the raster-like scans allows exploiting data independence to compute distance values for some of the points on the grid concurrently, say using a set of parallel computation units.

To demonstrate the parallelism, let us describe an exemplary right-down raster scan, starting from the top leftmost grid point 1. After a distance value is calculated for grid point 1, two points 2 adjacent to point 1 may be calculated in parallel. Points 2 may be calculated in parallel, since the two points 2 do not depend on each other. Similarly, points 3 may be calculated in parallel, points 4 may be calculated in parallel, etc.

One disadvantage of the parallelization illustrated above using FIG. 3a is that points that may be used in parallel (say points 5, or points 6) are not likely to be read into a computer memory together. The points are not likely to be read together, since the points (say points 5, or points 6) do not belong to a same line of the grid. A computer's memory typically stores read data (i.e. the grid) in a line by line, as known in the art.

Consequently, there results a lack of data coherence in the memory, which may deteriorate performance on many computer architectures, such as a Graphical Processing Unit (GPU), as described in further detail hereinbelow.

Another disadvantage of the parallelization illustrated above using FIG. 3a is that the number of grid points, which may be calculated (i.e have their distance value calculated) in each step (in parallel), varies. Actually, the benefit of parallelism is significant only for sufficiently long diagonals of the grid applied on the discrete representation of a manifold.

For example, three points 3 may be calculated concurrently in one step, whereas four points 4 may be calculated concurrently in the following step, and five points 5 may calculated concurrently after points' 5 distance value are calculated Reference is now made back to FIG. 2.

According to a preferred embodiment of the present invention, the traversal of the grid points may be rotated in 45°, as illustrated in FIG. 2 hereinabove, for each of the four directions (e-h).

Using a conceptually 45° rotated-like raster scan, illustrated in FIG. 2 hereinabove, all points of each single rows or column of the grid may be updated concurrently, since each point's distance value is calculated using only points which are positioned in a single row or a single column, as described in further detail hereinbelow.

Reference is now made to FIG. 3b, which is a simplified diagram illustrating a second traversal of grid points, using a raster-like scan, according to a preferred embodiment of the present invention.

As described hereinabove, by conceptually 45° rotating the scans, there is introduced enhanced parallelism.

The enhanced parallelism allows to iterate over rows (or columns) of the Euclidean grid applied on the computer implanted, and for each row (or column), to find a distance value for all points of the row (or column) in parallel.

Consequently, there is provided coherent access to memory and more efficient utilization of parallel processing capacities on a computing device used to approximate the distance map on the discrete representation of a manifold.

For example, all point 2's distance values are calculated in parallel (using known distance values pertaining to adjacent points 1), then all point 3's distance values are calculated in parallel, then all point 4's distance values are calculated in parallel, etc.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 4, which is a block diagram illustrating a first apparatus for parallel approximation of distance maps on a discrete representation of a manifold, according to a preferred embodiment of the present invention.

Apparatus 4000 for parallel approximation of distance maps on a discrete representation of a manifold 401. The manifold 401 has one or more Euclidean grids applied on the manifold.

The iterator 410 iterates over rows of each Euclidean grid applied on the manifold 401 in a first direction.

Apparatus 4000 further includes a distance value calculator 420, connected to the iterator 410.

For each row currently visited during the iterating in the first direction, the distance value calculator 420 calculates a distance value for each single cell of the currently visited row in parallel.

The calculation of the distance value is carried out according to a predefined approximation rule. The calculation is carried out using a distance value calculated for each one of cells of a single row visited immediately before the currently visited row. The cells of the row visited immediately before the currently visited row, are adjacent to the single cell in the Euclidean grid.

Optionally, the iterator 410 further iterates over rows of the Euclidean grid in a second direction. The distance value calculator 420 calculates, for each row currently visited during the iterating in the second direction, a distance value for each single cell of the currently visited row, in parallel. That is to say that all cells of the currently visited row are updated in parallel to each other.

The calculations are carried out according to the predefined approximation rule, using a distance value calculated for each one of respective cells of a row visited immediately before the currently visited row. The cells of the row visited before the currently visited row, are adjacent to the single cell in the Euclidean grid.

Optionally, the iterator 410 iterates in the second direction in parallel to iterating in the first direction.

Optionally, the predefined approximation rule comprises a Fast Marching based update scheme, as described in further detail hereinabove.

Optionally, the predefined approximation rule comprises a predefined geometric scheme, say a scheme based on geometric parameters calculated in advance of the iterating, as described in further detail hereinbelow.

Optionally, the distance value calculator 420 automatically calculates geometrical parameters for the Euclidean grid, and the predefined approximation rule involves the automatically calculated geometrical parameters.

Optionally, the Euclidean grid is a two (2D) dimensional grid, as described in further detail hereinbelow.

Optionally, the Euclidean grid is a three dimensional (3D) grid, as described in further detail hereinbelow.

Optionally, the distance value calculator 420 is implemented on a Graphical Processing Unit (GPU). Apparatus 400 may also includes a portion assigner, connected to the iterator 410, and configured to assign each of two or more portions of the Euclidean grid to a respective kernel of the Graphical Processing Unit (GPU), as described in further detail hereinbelow.

Reference is now made to FIG. 5, which is a block diagram illustrating a second apparatus for parallel approximation of distance maps on a discrete representation of a manifold, according to a preferred embodiment of the present invention.

Apparatus 5000 for parallel approximation of distance maps on a discrete representation of a manifold 501 includes a grid applier 500.

The grid applier 500 applies one or more Euclidean grid(s) on the discrete representation of a manifold 501.

Optionally, the grid applier 500 applies two or more different Euclidean grids on the discrete representation of a manifold. The grid applier 500 applies each one of the different grids on one portion of the discrete representation of a manifold.

For example, the manifold such as a human face may be represented in a computer. The grid applier 500 may apply a first grid on the nose, a second and a different grid on the eyes, etc., as described in further detail hereinbelow.

Apparatus 5000 further includes an iterator 510, connected to the grid applier 500.

The iterator 510 iterates over rows of each Euclidean grid applied on the manifold 501 in a first direction, as described in further detail hereinabove.

Apparatus 5000 further includes a distance value calculator 520, connected to the iterator 510.

For each row currently visited during the iterating in the first direction, the distance value calculator 520 calculates a distance value for each single cell of the currently visited row in parallel, as described in further detail hereinabove.

The calculation of the distance value is carried out according to a predefined approximation rule using a distance value calculated for each one of cells of a single row visited immediately before the currently visited row. The cells of the row visited immediately before the currently visited row, are adjacent to the single cell in the Euclidean grid.

Reference is now made to FIG. 6, which is a flowchart illustrating a first method for parallel approximation of distance maps on a discrete representation of a manifold, according to a preferred embodiment of the present invention.

In a method 6000 for parallel approximation of distance maps on a discrete representation of a manifold, according to a preferred embodiment of the present invention, there is carried out an iterating 610, say using the iterator 510, as described in further detail hereinabove.

That is to say, for one or more Euclidean grid applied on the discrete representation of a manifold, there is carried out iterating 610 over rows of the Euclidean grid in a first direction.

For each row currently visited during the iterating 610 in the first direction, there is calculated 520 a distance value for each single cell of the currently visited row in parallel.

The calculating 620 is carried out according to a predefined approximation rule, using a distance value calculated for each one of cells of a row visited immediately before the currently visited row. The cells of the row visited immediately before the currently visited row, are adjacent to the single cell in the Euclidean grid.

Optionally, prior to the iterating 610, there the Euclidean grid(s) are applied on the discrete representation of a manifold, say using a grid applier 500, as described in further detail hereinabove.

Optionally, different Euclidean grids are applied on the discrete representation of a manifold, and each grid is applied on a respective portion of the discrete representation of a manifold, as described in further detail hereinbelow.

Optionally, the predefined approximation rule comprises a Fast Marching based update scheme, as described in further detail hereinabove.

Optionally, the predefined approximation rule comprises a predefined geometric scheme, say a scheme based on geometric parameters calculated in advance of the iterating, as described in further detail hereinbelow.

Optionally, geometrical parameters for the Euclidean grid are automatically calculated, and the predefined approximation rule involves the automatically calculated geometrical parameters, as describe in further detail hereinbelow.

Optionally, the Euclidean grid is a two (2D) dimensional grid.

Optionally, the Euclidean grid is a three dimensional (3D) grid.

Optionally, the iterating and calculating are carried out using a Graphical Processing Unit (GPU). There may also be carried out assigning of each of two or more portions of the grid to a respective kernel of the Graphical Processing Unit (GPU), as described in further detail hereinbelow.

Optionally, there is further carried out iterating 630 in a second direction, over rows of the Euclidean grid.

For each row currently visited during the iterating 630 in the second direction, there is calculated 640 a distance value for each single cell of the currently visited row, in parallel.

The calculating is carried out according to the predefined approximation rule, using a distance value calculated for each one of respective cells of a row visited immediately before the currently visited row.

The cells of the row visited before the currently visited row, are adjacent to the single cell in the Euclidean grid.

Another way to increase the parallelism is to combine the iterating in two directions, that is to say, to iterate in one direction parallel to iterating in a second direction.

Thus, optionally, the iterating in the second direction is carried out in parallel to the iterating in the first direction, say iterating over columns, from right to left in parallel to iterating over the columns from left to right.

Optionally, in a third direction, there is carried out iterating over columns of the Euclidean grid. For each column currently visited during the iterating in the third direction, there are calculated distance values, in parallel.

Each distance value is calculated for a single cell of the currently visited column, according to the predefined approximation rule, using a distance value calculated for each one of cells of a column visited immediately before the currently visited column. The cells of the column visited before the currently visited column, are adjacent to the single cell in the Euclidean grid.

Optionally, there is carried out iterating in a fourth direction, over columns of the Euclidean grid.

For each column currently visited during the iterating in the fourth direction, there is calculated a distance value for each single cell of the currently visited column in parallel, wherein said calculating is carried out according to the predefined approximation rule, as described in further detail hereinabove.

The approximation rule involves a distance value calculated for each one of respective cells of a column visited immediately before the currently visited column. The cells of the column visited before the currently visited column, are adjacent to the single cell in the Euclidean grid.

Optionally, the fourth direction iterating is carried out in parallel to the iterating in the third direction, as described in further detail hereinbelow..

Reference is now made to FIG. 7, which is a flowchart illustrating a second method for parallel approximation of distance maps on a discrete representation of a manifold, according to a preferred embodiment of the present invention.

A preprocess step calculates all the geometry parameters needed for distance calculation steps. Since the parameters depend solely on geometry, the parameters are calculate only once, and hold for all steps which follow The next step 720 includes iterating over rows of the Euclidean grid applied on the discrete representation of a manifold, in a bottom-up direction and in an up-bottom direction, in parallel.

For all points on a row currently visited, in parallel, there is carried calculation of a distance value, using a predefined update rule, based on the update scheme of Fast Marching, and the geometrical parameters calculated in the preprocessing step 710.

That is to say that both the up iterating and down iterating are carried out in parallel independently. In each direction (up and down), grid points (i.e distance values for each point) are calculated row by row. All points of a single row are calculated in parallel. Each point is updated according to three points from a previous row, as described in further detail, hereinabove, using FIGS. 2 and 3.

When the parallel iterating in both up and down direction ends, the distance map calculation transposes 725, and a left and right iterating and distance value calculation step 730 is performed column by column in a similar fashion.

Preferably, when the left and right iterating ends, the distance map calculation direction transposes again 735, and the up and down iterating 720 is repeated for a second time, following by a second time running of the left and right iterating 730.

The method keeps looping until the distance map seems to converge 750, i.e. until the distance value for each cell stabilizes throughout the four direction iterating.

Distance Map Computation on a Graphical Processing Unit (GPU)

Modern GPUs are extremely powerful processors. In this section we describe an efficient way to implement an apparatus 4000, according to a preferred embodiment of the present invention, on a GPU environment.

Optionally, there is used the NVIDIA™' Compute United Device Architecture (CUDA) platform. The AMD™ platform may also be used.

The G8X series GPUs supporting CUDA have multiple independent processing units. When programmed using CUDA, the GPU may be viewed as a processing unit capable of executing thousands of threads in parallel.

Both the CPU (hereinafter referred to as host) and the GPU (hereinafter referred to as device) maintain their own memory.

Data may be transferred from one memory to another over the PCI bus, as know in the art. However, the bandwidth of PCI bus (typically 4 GB/sec) is significantly smaller, compared to the bandwidth of internal buses on the GPU (about 100 GB/sec for currently available NVIDIA GPUs).

CUDA provide access to a device Direct Dynamic Random Access Memory (DRAM) memory either through global memory or texture memory, as known in the art. In addition, CUDA features on-chip shared memory with extremely fast general read/write access, used to share data between threads.

Texture memory is a read-only memory with a cache optimized for 2D spatial locality. The global memory is a read/write non-cached memory space.

Access to device memory is relatively slow compared to the speed of arithmetic calculations, making GPUs especially suitable for programs with high arithmetic intensity (ratio between Arithmetic Logic Unit (ALU) and memory access operations) and potentially inefficient for those with a low one.

For example, the NVIDIA 8800GTX GPU can theoretically perform 345 G floating points operations per second, while having the memory bandwidth of only 86 GB/sec=22G floats/sec (when latency is completely hidden).

In order to get better utilization of the computational power of the GPU and avoid the memory bandwidth bottleneck, memory access to device memory is minimized. One way of minimizing is by fetching a large portion of data from the global memory into shared memory (access to shared memory can be as fast as reading from a register, as known in the art) followed by as many computations as possible, and finally writing back the result to the global memory.

The shared memory in this case may be thought of as user-managed cache. Preferably, access to global memory is coherent, in a way that subsequent threads access subsequent addresses in linear memory, so as to avoid slow memory bandwidth.

Texture memory is more flexible in the sense that coherence is two-dimensional. However, texture memory is a read-only memory and there is no manual control over the caching scheme.

Architecture of the computational units in the GPU is single-program-multiple-data (SPMD), allowing to execute the same function independently on different data.

Functions executed in this way are called kernels. The execution of a kernel is organized as a grid of thread blocks. A thread block is a batch of threads that may cooperate together by efficiently sharing data through a fast shared memory, and synchronizing their execution to coordinate memory accesses.

The maximum number of threads in a single thread block is limited. However, many thread blocks may be batched together into a grid of blocks that may be processed by the device in parallel.

It is important to note that communication and synchronization between threads of different thread blocks on the same grid is impossible. The only way to impose a global synchronization point on all threads is to divide the work into separate kernel invocations.

One limitation of the device memory is the memory latency (400-600 cycles). Much of this latency can be hidden by the GPU thread scheduler if there are sufficient independent arithmetic instructions that can be issued while waiting for memory accesses to completed.

That is to say that while some threads are stalled by memory latency, others may progress with ALU computations. In order for the ALU computations to procede, there are needed enough threads waiting for execution, which implies that a grid of thread blocks better contain as many as possible threads.

Thus, according to a preferred embodiment, each row or column of the Euclidean grid may be assigned to a single kernel call. Each thread in each thread block calculates the distance value at a single point according to the previous distance at that point and three distances of the vertices at the previous row/column, as described in further detail hereinabove.

Kernel invocations serve as global synchronization point, so as to make sure that the next row/column is processed only after the previous row/column is already calculated.

However, invoking a single kernel for each row/column in the grid leads to too excessive kernel invocations. A kernel invocation consumes a fixed overhead regardless of how many computations are actually performed in the kernel.

One remedy is to use a kernel that processes a batch of rows rather than a single row at a time. Each such batch is composed of a strip of consecutive rows, such that the total number of kernel invocations is reduced.

For each row in the strip, each thread fetches the former distance at that point from the distance map into the shared memory. The thread then calculates the distance value and writes the result back to the distance map. All threads are then synchronized. Once all the threads reach the synchronization point, each thread can start working on the next row in the strip.

Besides having the advantage of reduced number of kernel invocations, the above described access pattern also leads to higher arithmetic intensity, since for a large enough strip, a single fetch from the distance map per one point is required (instead of four), since we can keep the computed distances of the previous row in the shared memory and do not need to read them again from global memory as we advance to the next row.

On the other hand, while communication through shared memory and synchronization between threads of the same thread block is possible, there is no synchronization mechanism between threads of different thread blocks. Since the maximum number of threads in a thread block is limited (512 on a current NVIDIA GPU), the access pattern is limited to small grids only.

Further, modern GPUs have several independent multiprocessors, working in parallel (16 on latest NVIDIA GPU), and since each thread block may be processed by a single multiprocessor only, the utilization of the hardware is too low.

Reference is now made to FIG. 8, which is a simplified block diagram illustrating a first exemplary implementation of a method on a GPU, according to a preferred embodiment of the present invention.

FIG. 8 shows a small portion of a distance map that is handled by a single thread block, with 32 threads, and 8 rows. Thread 0 is likely to produce valid result only at row 0, since at any other row, the distance value calculations depend on points which are located left to row 0.

Distance values that are based on points located left to 0 belong to a different thread block, which may contain errors. In general, only the central area 810 is independent of other blocks.

Reference is now made to FIG. 9, which is a simplified block diagram illustrating a second exemplary implementation of a method on a GPU, according to a preferred embodiment of the present invention.

According to a preferred embodiment, there is allowed some partial overlap between subsequent thread blocks, such that each thread block calculates distance values only in the area not dependent on other blocks The blocks are allowed to overlap only in such a way that each vertex of the grid belongs to at least one area independent on other threads.

FIG. 9 shows a small portion of the distance map covered by three overlapping blocks.

Note that some points belong to two areas. In order to avoid write conflicts, it is agreed that only the block on the right may write the distance value to the global memory. Consequently, each point's distance value is written only by exactly one thread.

Many applications requires the computation of a distances from all the points on the surface to all other points on the surface. One way of dealing with such a heavy computational task is to use the present methods independently for each point on the surface.

At each step, a single point is considered as source point and distances between the source point to all other points on the surface are computed. Computing only half of the pairwise distances is enough since the distance from a point p1 to a point p2 is the same as the distance between p2 to p1.

In practice, there may be exploited the fact that the geometry of the surface is the same for all the distance maps. Careful observation of the above described GPU implementations shows that the implementations are bandwidth limited.

Consequently, the number of memory accesses per grid point is high compared with the amount of computations that are needed to be performed.

Preferably, each block may be assigned to handle a group of distance maps rather than a single map. Geometric parameters are loaded only once, and stored in the shared memory (or in the texture cache).

This way, the amount of memory accesses is negligible compared to the amount of arithmetic computations made, and a future availability of much stronger computation power in GPUs, may prove extremely useful.

According to preferred embodiments described hereinabove, the Euclidean grid is two dimensional (2D). With a 2D grid, the distance value calculated are shortest distances where the path is constrained to be on the manifold.

According to a preferred embodiment of the present invention, the Euclidean grid is a three dimensional (3D) grid.

The 3D grid is iterated in six planes, and the points (i.e. distance values) in each plane are calculated in a parallel way. Each point's distance value is calculated based on the Fast Marching update scheme, using nine adjacent points that belongs to the previous visited plane.

For example, the distance of every point in the space may help identify if another object is intersection with the object in question or not, in a collision detection problem, as known in the art.

Eikonal Equation on Geometry Images

The problem of distance map approximation may be formulated as the viscosity solution of the eikonal equation, as known in the art:

$$\|\nabla t\|=1, \; t(S)=0, \quad (1)$$

For the largest part of the discussion below we focus our attention on parametric two-dimensional manifolds, i.e. surfaces that can be represented by a single smooth map x.:

$$x: U \rightarrow \mathbb{R}^3, \text{ where } U \subset \mathbb{R}^2$$

The formula presented above is a parameterization domain, as known in the art. The topology of U depends on the topology of the surface. The derivatives are:

$$\xi_i = \frac{\partial x}{\partial u^i} \quad (2)$$

Reference is now made to FIG. 10, which a simplified diagram illustrating coordinates in the parameterization domain, according to a preferred embodiment of the present invention.

The derivatives with respect to the parametrization coordinates constitute a local system of coordinates on the surface.

In the left, there is presented the parameterization coordinate system, and in the right, there are presented the corresponding coordinates, positioned on the surface.

Distances on the surface are measured according to the differential arclength element:

$$ds^2 = du^T G du, \quad (3)$$

where $du=(du^1, du^2)$ and G is a 2×2 metric matrix, whose elements are given by:

$$g_{ij} = \xi_i^T \xi_j,$$

The local system of coordinates is orthogonal if and only if G is diagonal (note that orthogonality of the coordinate system in the parameterization domain does not imply orthogonality of the coordinate system on the surface).

A distance map on the surface is computed by solving the eikonal equation, expressed on a discrete grid obtained by sampling the parameterization domain U, as:

$$\|\nabla_G t\|^2 = \nabla_u^T t G(u)^{-1} \nabla_u t = 1 \quad (4)$$

A special case, usually referred to as a geometry image, is obtained by discretization of the parameterization domain on a regular Cartesian grid with equal steps, which for convenience are henceforth assumed to be 1 in each direction.

The origin of the term stems from the fact that the surface may be represented as tree matrices holding the coordinates of the sampled surface x(U).

In a geometry image, a grid point $u_0$ can be connected to its neighbors $u_0+m$ according some grid connectivity. The simplest grid connectivity is based on four neighbors:

$$m=(\pm 1,0)^T, (0,\pm 1)^T.$$

Another possible grid connectivity is the eight-neighbor connectivity, where:

$$m=(\pm 1,0)^T, (0,\pm 1)^T, (\pm 1,\pm 1)^T.$$

The former two grid connectivity patterns create four and eight triangles, respectively, supporting the grid point $U_0$.

Let us examine a triangle created by $x_0=x(u_0)$, $x1=x(u_0+m_1)$, and $x_2=x(u_0+m_2)$. Without loss of generality, it is assumed that $x_0=0$. In local coordinates, is can be formulated:

$$x_i = x_0 + m_i^1 \xi_1 + m_i^2 \xi_2, \quad (5)$$

or $$X=TM, \text{ where } X=(x_1,x_2), T=(\xi_1,\xi_2), \text{ and } M=(m_1,m_2)$$

The matrix E=MTGM describes the geometry of the triangle. If e12>0 is positive, the angle formed between x1, x0 and x2 is acute.

Update Step

The fast marching method can be formulated for parametric surfaces as shown in [Spira and Kimmel 2004]. All computations are performed on the grid in the parameterization domain, though the distances are computed with respect to the surface metric G.

In the numerical core of this method lies the update step, which given a grid point $u_0$ and the times of arrival of its neighbors, computes the time of arrival $t(u_0)$. Since $u_0$ is shared by several triangles (the exact number of triangles depends on the grid connectivity), $t(u_0)$ is computed in each triangle and the smallest value is selected to update the time of arrival at $u_0$, i.e. the distance value for $u_0$.

Let $u_0$ be updated from its two neighbors u1=u+m1 and u2=u0+m2, whose times of arrival are $t_1=t(u_0+m_1)$ and t2=t$(u_0+m_2)$. We denote $xi=x(u_i)$ and assume without loss of generality that $x_0=0$. Our goal is to compute $t_0=t(u_0)$ based on $t_1, t_2$ and the geometry of the triangle $x_1 x_0 x_2$. The update of $x_0$ obeys the following properties:

(1) Consistency: $t_0 > \max(t_1, t_2)$.
(2) Monotonicity: an increase of $t_1$ or $t_2$ increases $t_0$.
(3) Upwinding: the update has to be accepted only from a triangle containing the characteristic direction (characteristics of the eikonal equation coincide with minimum geodesics on the surface).
(4) Numerical stability: a small perturbation in $t_1$ or $t_2$ results in a bounded perturbation in $t_0$.

Plannar Wavefront Approximation

In the original fast marching method, a vertex (also referred to hereinabove as a point) is updated by simulating a planar wavefront propagating inside the triangle [Kimmel and Sethian 1998]. The values of the two supporting vertices allow to compute the front direction. The same update scheme is used in [Spira and Kimmel 2004].

Reference is now made to FIG. 11, which is a simplified diagram illustrating a first update scheme, according to a preferred embodiment of the present invention.

According to a preferred embodiment, there is presented used an improved scheme. The improved scheme is based on the traditional Fast Marching update scheme. However, the present improved is more compact, and avoids the use of trigonometric functions. Consequently, the computation may be more efficient.

In the present scheme, a wave front is modeled as a planar wave propagating from a virtual planar source described by the equation $n^T x + p = 0$, where n is the propagation direction.

By using supporting vertices (also referred to hereinabove as points) $x_1, x_2$ of the triangle, which lie at distances $t_1$ and $t_2$, respectively, from the source, we obtain:

$$X^T n + p \cdot 1 = t, \quad (6)$$

where X is a matrix whose columns are $x_1$ and $x_2$, $1 = (1,1)^T$, and $t = (t_1, t_2)T$.

The wave front time of arrival, to the updated vertex $x_0$, is given by its distance from the planar source:

$$t_0 = n^T x_0 + p = p. \quad (7)$$

Assuming that the mesh is non-degenerate, x1 and x2 are linearly independent, and solving (6) for n, it is obtained:

$$n = X(X^T X)^{-1}(t - p \cdot 1). \quad (8)$$

Invoking a condition that $\|n\| = 1$, yields:

$$\begin{aligned} 1 &= n^T n \\ &= (t - p \cdot 1)^T (X^T X)^{-T} X^T X (X^T X)^{-1} (t - p \cdot 1) \\ &= (t - p \cdot 1)^T (X^T X)^{-1} (t - p \cdot 1) \\ &= p^2 \cdot 1^T Q 1 - 2p \cdot 1^T Q t + t^T Q t, \end{aligned} \quad (9)$$

where $Q = (X^T X)^{-1} = E^{-1}$. Hence, $t_0$ is the largest solution of the quadratic equation:

$$t_0^2 \cdot 1^T Q 1 - 2 t_0 \cdot 1^T Q t + t^T Q t - 1 = 0 \quad (10)$$

The smallest solution corresponds to the opposite propagation direction, where the wave front arrives to x0 before the wave front arrives to x1 and x2 and is therefore discarded.

To speed the solution up, the terms $1^T Q 1$ and $1^T Q$, which depend on the grid geometry only, are pre-computed.

The consistency condition may be formulated as $p \cdot 1 > X^T n + p \cdot 1$, or simply $X^T n < 0$, which is geometrically interpreted as a demand that the $-n$ direction forms acute angles with the triangle edges.

In order to have monotonicity:

$$\nabla_t t_0 = \left( \frac{\partial t_0}{\partial t_1}, \frac{\partial t_0}{\partial t_2} \right)^T > 0. \quad (11)$$

Differentiating (10) with respect to t, we obtain:

$$t_0 \cdot \nabla_t t_0 \cdot 1^T Q 1 - \nabla_t t_0 \cdot 1^T Q t - t_0 \cdot Q 1 + Q t = 0, \quad (12)$$

$$\nabla_t t_0 = \frac{Q(t - p \cdot 1)}{1^T Q(t - p \cdot 1)}. \quad (13)$$

Substituting (8), we can write:

$$Q(t - p \cdot 1) = (X^T X)^{-1} X^T n = Q X^T n. \quad (14)$$

The monotonicity condition (11) is satisfied when either $Q X^T n > 0$, or $Q X^T n < 0$, that is to say that both coordinates of $Q X^T n$ have the same sign. However, since the consistency of the solution requires $X^T n$ to be negative, and Q is positive semi-definite, $Q X^T n$ cannot have both coordinates positive.

We therefore conclude that the solution satisfies $Q X^T n = Q(t - p \cdot 1) < 0$. This yields:

$$1^T Q(t - p \cdot 1)$$

$$0 > Q(t - p \cdot 1) = (X^T X)^{-1} X^T n, \quad (15)$$

where the inequality is interpreted coordinate-wise. Observe that the rows of the matrix $(XTX)_1 XT$ are orthogonal to $x_1$, $x_2$, or in other words, are normal to the triangle edges.

This gives the following geometric interpretation of the monotonicity condition: the direction $-n$ comes from within the triangle. Since the update direction also maintains the consistency condition, any direction coming from within the triangle also forms acute angles with the triangle edges. Consequently, angle x1x0x2 is acute (or, equivalently, $e_{12} > 0$).

The consistency and monotonicity conditions mean that the update (i.e the calculation of the distance values for each point) is performed only using a triangle which contains the characteristic direction, which makes the update scheme upwind [Sethian and Vladimirsky 2000].

However, since n is only an approximation of the characteristic direction, it may happen that the conditions are not satisfied even if the point lies inside the triangle. For a sufficiently small triangle, this may happen only if any of the two inner products $n^T x_1$, $n^T x_2$ is sufficiently close to zero. This corresponds to the situation in which $t_0$ is updated from a single one of the triangle edges (one-dimensional simplices) $x_0 x_1$, $x_0 x_2$. In this case, the simple Dijkstra-type update may be performed:

$$t_0 = \min\{t_1 + \|x_1\|, t_2 + \|x_2\|\}. \quad (16)$$

In order to ensure that the update scheme is numerically stable, we assume that $t_i$ is affected by a small error $\epsilon$. The small error $\epsilon$ influences the computed time of arrival $t_0$. Using first-order Taylor expansion, we have:

$$\tilde{t}_0 \approx t_0 + \varepsilon \cdot \frac{\partial t_0}{\partial t_i} \leq t_0 + \varepsilon \cdot \left( \left| \frac{\partial t_0}{\partial t_1} \right| + \left| \frac{\partial t_0}{\partial t_2} \right| \right). \quad (17)$$

Under the monotonicity condition (11):

$$\tilde{t}_0 \approx t_0 + \varepsilon \cdot 1^T \nabla_t t_0 = t_0 + \varepsilon \cdot \frac{1^T Q(t - p \cdot 1)}{1^T Q(t - p \cdot 1)} = t_0 + \varepsilon. \quad (18)$$

The error in $t_0$ is also bounded in the one-dimensional Dijkstra-type update, which makes the update formula stable.

Optionally, the planner wave front approximation scheme described in this section includes the following set of instructions:

---

1 Set $t_0^{new} \leftarrow t_0$.
2 foreach triangle $X = (x_1, x_2)^T$ do
3    Solve the quadratic equation (10) for $t_0$.
4    if $Q(t - t_0 \cdot 1) > 0$ or $t_0 < \max\{t(x_1), t(x_2)\}$ then compute $t_0$ according to (16).
5    Set $t_0^{new} \leftarrow \min\{t_0^{new}, t_0\}$.
6 end

---

Note that the set of instructions is valid only for acute triangulations. When some triangles have obtuse angles ($e_{12}<0$), they have to be split by adding connections to additional neighboring grid points, as proposed by Spira and Kimmel in [2004].

Spherical Wavefront Approximation

A different update scheme is proposed by Novotni and Klein [Novotni and Klein 2002]. In Novotni and Klein's scheme, a vertex (grid point) is calculated with the point's Euclidean distance from a virtual point source, whose coordinates are estimated from the times of arrival to the two supporting vertices.

The Novotni and Klein scheme resembles the Mitchel-Mount-Papadimitriou method [Mitchell et al. 1987; Surazhsky et al. 2005], and may prove more accurate that the planar wave front approximation described in further detail hereinabove.

According to Novotni and Klein, the wave front is modeled as a spherical (circular) wave propagating from a virtual point source x (FIG. 11, right). Provided the supporting vertices $x_1$, $x_2$ of the triangle lie at distances $t_1$ and $t_2$, respectively, from the source, we obtain for i=1, 2:

$$t_i^2 = (x_i-x)^T(x_i-x) = x_i^T x_i - 2x_i^T x + x^T x. \quad (19)$$

The time of arrival of the wave front to the updated vertex $x_0$ is given by the distance of the vertex $x_0$ from the point source:

$$t_0^2 = (x_0-x)^T(x_0-x) = x^T x. \quad (20)$$

Denoting $s_i = t_i^2$, and $q = (s1 - x^T_1 x_1, s_2 - x^T_2 x_2)^T$, we obtain $$s_0 \cdot 1 - 2X^T x = q. \quad (21)$$

Assuming the mesh to be non-degenerate, $$x = \frac{1}{2}X(X^T X)^{-1}(s_0 \cdot 1 - q) = \frac{1}{2}XQ(s_0 \cdot 1 - q). \quad (22)$$

Plugging the later result into (20), we have:

$$s_0 = x^T x = \frac{1}{4}(s_0 \cdot 1 - q)^T Q(s_0 \cdot 1 - q) \quad (23)$$
$$= \frac{1}{4}(s_0^2 \cdot 1^T Q1 - 2s_0 \cdot 1^T Qq + q^T Qq).$$

Consequently, $t_0$ is given as the largest positive solution of the following bi-quadratic equation:

$$t_0^4 \cdot 1^T Q1 - 2t_0^2 \cdot (1^T Qq+2) + q^T Qq = 0. \quad (24)$$

In order to enforce consistency:

$$s_0 > s_i = (x_i - x)^T(x_i - x) = x_i^T x_i - 2x_i^T x + x^T x \quad (25)$$
$$= x_i^T(x_i - 2x) + s_0,$$

Alternatively:

$$x_i^T\left(x - \frac{1}{2}x_i\right) > 0. \quad (26)$$

The geometric interpretation of the former condition is that the source point x lies at the positive sides of two perpendicular bisectors to the edges $x_0 x_1$ and $x_0 x_2$. To enforce monotonicity, we differentiate (24) with respect to $s = (s1, s2)^T$, $$2s_0 \cdot \nabla_s s_0 \cdot 1^T Q1 - 2\nabla_s s_0 \cdot (1^T Qq+2) - 2s_0 \cdot Q1 + 2Qq = 0, \quad (27)$$

from where:

$$\nabla_s s_0 = \frac{Q(s_0 \cdot 1 - q)}{1^T Q(s_0 \cdot 1 - q) - 2}. \quad (28)$$

requiring:

$$\nabla_s s_0 > 0,$$

together with the consistency condition mentioned hereinabove, yields:

$$Q(s_0 \cdot 1 - q) > 0, \text{ or}$$

$$QX^T x > 0, \quad (29)$$

which can be interpreted geometrically as a demand that x lies inside the angle $x_1 x_0 x_2$.

Reference is now made to FIG. 12, which is a simplified diagram illustrating a second update scheme, according to a preferred embodiment of the present invention.

FIG. 12 shows that some characteristic directions lying inside the triangle violate consistency or monotonicity. Therefore, the spherical wave front update scheme is likely to introduce errors that propagate with the computed front.

Also note that unlike the planar counterpart, the spherical wave front propagation model is not numerically stable.

For example for any x:

$$\|\nabla_s s_0\| > 1.$$

Further, for x lying on the edge x1x2, the gradient is infinite, meaning that the roundoff errors may explode, thus invalidating the numerical solution can potentially explode, invalidating the numerical solution.

The disadvantages of the spherical wave front scheme become less pronounced for:

$$t \gg l,$$

where l is the largest triangle edge length.

However, for large values of the arrival times, the spherical and the planar models converge and produce nearly identical solutions.

Raster Scan Method

One of the disadvantages of the fast marching method is that it is inherently sequential, thus allowing no parallelization. In addition, the visiting order of the grid points depend on the shape of the propagating wave front, and is therefore data-dependent. This results in irregular memory access that is unlikely to utilize the lcaching system efficiently.

In his classical paper, Danielsson [1980] observed that since the geodesics on the Euclidean plane are straight lines, all possible characteristic directions of the eikonal equation fall into one of the four quadrants of a Cartesian grid, and can be therefore covered by traversing the grid in four directed raster scans.

Danielsson's raster scan spirit is adopted in [Zhao 2004] for solving the eikonal equation on weighted Euclidean domains, and in Bornemann and Rasch [Bornemann and Rasch 2006]. Similar ideas date back to Dupuis and Oliensis' studies on shape from shading [Dupuis and Oliensis 1994].

Raster scan traversal has linear complexity in the size of the grid, and is characterized by regular access to memory, which increases the efficiency of caching. Since the order of visiting of the grid points is independent of the data and is known in advance, one can use the pre-caching mechanism, supported in many modern processors.

In addition, unlike a classical priority queue-based counterpart, raster scan can be efficiently parallelized, as described in further detail hereinbelow.

According to a preferred embodiment, a raster scan order may be used to traverse the Cartesian grid in the surface parameterization domain, as illustrated in the following set of instructions:

```
Output: The distance map t : U → ℝ⁺
Initialization
1   Pre-compute the update equation coefficients for each triangle.
2   foreach point u ∈ U\S do t(u) ← ∞
    Iteration
3   for iter = 1,2,... do
4       for i = 1,2,...,M do
            Right-up scan
5           for j = 1,2,...,N do Update (u_ij)
            Right-down scan
6           for j = N,N − 1,...,1 do Update (u_ij)
7       end
8       for i = M,M − 1,...,1 do
            Left-up scan
9           for j = 1,2,...,N do Update (u_ij)
            Left-down scan
10          for j = N,N − 1,...,1 do Update (u_ij)
11      end
12      if ||t^(n) − t^(n−1)|| = 0 then stop
13  end
```

As in the priority queue-based traversal order, all computations are done in the parameterization domain, taking into account the metric on the surface. Since each directed raster scan covers only ±90 degrees of possible characteristic directions, the update of a point on the grid can be done only from the triangles containing that direction.

For example, if the eight-neighbor grid connectivity is used, only two triangles formed by three neighbor grid points are required in the update (i.e. for calculating the distance value for a specific grid point, as illustrated in the first row of FIG. 2, hereinabove).

Unlike the Euclidean case where the characteristics are straight lines, on a general geometry image, the characteristics in the parametrization domain are usually curved. This implies that the four raster scans may cover only a part of a characteristic, and have to be repeated more times in order to produce a consistent distance map, as described in further detail hereinabove.

Consequently, the complexity of the raster method for geometry images is θ ($N_{iter}$·n), where n is the grid size, and $N_{iter}$ is the data-dependent number of iterations.

In what follows, there is presented a bound on the maximum number of iterations required before the method stops, (i.e. converges into a stable solution for all points on the grid).

PROPOSITION 1. Algorithm 3 applied to a geometry image x(U) will stop after at most $$N_{iter} \leq \left\lceil \frac{2D\lambda_{max}^G}{\pi\lambda_{min}^G} \sqrt{(\lambda_{min}^{H1})^2 + (\lambda_{min}^{H2})^2 + (\lambda_{min}^{H3})^2} \right\rceil + 1$$

iterations, where D is the surface diameter, $\lambda_{min}^{H^i}$ is the smallest eigenvalue of the Hessian matrix $H^i = \nabla_{SB}^2 x^i$ of $x^i$ with respect to the parameterization coordinates u, and $\lambda_{max}^G / \lambda_{min}^G$ is the condition of the metric G.

For proof, see Appendix A. When the surface is given as a graph of a function z(x,y), the bound can be simplified as $$N_{iter} \leq \left\lceil \frac{2D\lambda_{max}^G}{\pi\lambda_{min}^G} \lambda_{min}^H \right\rceil + 1, \quad (30)$$

where $H = \nabla^2 z$.

The main significance of this bound is that the maximum number of iterations does not depend on the discretization of U, and is a constant regardless of the grid size. Note, however, that the bound depends both on the properties of the surface expressed in terms of the metric G and the diameter D, and those of the parameterization expressed in terms of the Hessian $H^i$.

This means that some parameterizations of the same surface may be less favorable for the raster scan. For example, in the parameterization $x = (u^1 \cos u^2; u^1 \sin u^2; 0)^T$ of a flat disc, the characteristics in the parameterization domain are curved and require multiple iterations to be covered.

Note that the bound is a worst case bound. In practice, the number of iterations required for convergence may be smaller. Adding another triangle to the grid update such that every grid point is updated from four causal (in the raster scan order) neighbors, rather than from three causal neighbors as shown in FIG. 2, may reduce the number of iterations.

It is important to emphasize that in the worst case $N_{iter}$ remains unchanged.

The main disadvantage of the raster scan method is the lack of flexibility in controlling the tradeoff between the method complexity and accuracy, unlike some other distance approximation methods, like the phase flow [Ying and Cand'es 2006] and the approximate MMP method [Surazhsky et al. 2005].

Parallelization

As illustrated using FIG. 3a hereinabove, the structure of the raster scan gives much opportunity for exploiting data independence to compute some of the grid updates concurrently on a set of parallel computation units.

To demonstrate the parallelism, let us consider for example the right-down raster scan, starting from the top leftmost grid point 1.

After point 1 is updated (i.e after a distance value is calculated for point 1), points 2 may be updated concurrently, since their updates do not depend on each other. Next, the points 3 are updated concurrently, and so on.

Assuming the number of available computation units is P≧min (M, N), the right-down raster scan may be performed in M+N−1 steps.

If the number of processors is smaller, every step is serialized into (k+1)/P sub-steps. The other three directed raster scans are parallelized in the same manner.

An obvious disadvantage of such a parallelization is the lack of data coherence in the memory, which may deteriorate performance on many architectures, such as Graphical Processing Units (GPUs).

Another disadvantage is the fact that the number of operations in each step is not constant and the benefit from the parallelization is obtained only on sufficiently long diagonals.

One way to overcome these two difficulties is to rotate the direction of all raster scans by 45° (As illustrated in FIG. 2's second row, and explained in further detail hereinabove).

Using the rotated raster scans, rows or columns of the grid can be updated concurrently, as illustrated in FIG. 3b, and explained in further detail hereinabove.

Consequently, there is allowed coherent access to memory, and there is provided better parallelization with a speedup factor of P.

Since the same calculations are performed to update all the grid points, the 45° rotated scan method is suitable for implementation on an SIMD processor, as described in further detail hereinabove. We hereinafter refer to this parallelized scheme as to parallel marching.

Extensions to Multi-Chart Geometry Images

In this section, we discuss a generalization of the raster scan algorithm to multi-chart geometry images, i.e. surfaces represented as an atlas of overlapping charts.

Formally, we are given a collection of K maps:

$$x^k: U^K \to \mathbb{R}^3, k=1,\ldots,K,$$

where each $U^k$ is sampled on a regular Cartesian grid, usually, with different sampling density, according to the detail level of the underlying surface.

For simplicity, we assume that the charts overlap only at the boundaries, i.e for two neighboring charts i and j:

$$x^i(U^i) \cap x^j(U^j) \subseteq x^i(\partial U^i), x^j(\partial U^j).$$

We denote:

$\mathscr{P}_{ij}$ an operator projecting the values of the distance map $t^i$, from $\partial U^i$ onto the shared portion of $\partial U^j$, The charts are organized as an undirected adjacency graph with K vertices, and edges (i; j) corresponding to each pair of adjacent charts i and j. We denote by Ni the collection of all the neighboring charts of the chart i. The problem of distance computation on a multi-chart manifold can be thought of as distance computation in such an adjacency graph, in which each vertex (i.e. grid point) represents a chart Consequently, the problem may be solved using Dijkstra generalized:

For example, when computing the distance map from a single point $u \in U^k$, Q is set to $\{(k;0;u;0)\}$ (note, however, that the source is not necessarily limited to a single point, and the computing may span across multiple charts). The algorithm proceeds by removing the quadruplet (k; t;$S_0$; $t_0$) with the minimum t from the queue, and running the single-chart raster scan algorithm on $U^k$, with $S_0$ and $t_0$ ($S_0$) serving as the source.

This produces the distance map:

$$t^k: U^k \to \mathbb{R}^+$$

Next, the values of $t^k$ on the chart boundary are projected onto the neighbor charts $U^i$, $i \in N_k$, using the operator:

$$\mathscr{P}_{ki}.$$

In order to guarantee monotonicity, the minimum between the extrapolated value:

$$\mathscr{P}_{ki} t^k,$$

and the current value of $t^i$ is used.

We denote by $\delta^i$ the maximum difference between the previous and the new value of $t^i$ on the shared portion of boundary:

$$\partial U^i.$$

A non-trivial $\delta^i$ implies that the distance map ti is not up-to-date. In such a case, points on the boundary:

$$\partial U^i,$$

where the distance map value has decreased are added to the initial set of source points, and the chart is added to the priority queue with the distance value t set to be the minimum value of the updated points. The algorithm terminates when the queue becomes empty, implying by construction that all distance maps are up-to-date.

Unlike the standard Dijkstra's algorithm, the described procedure is no more a single-pass algorithm. In fact, a geo-

---

Input: K grids $U^1,\ldots,U^K$; projection operators $\mathscr{P}_{ij}$; sources with corresponding initial values
   $\{(S_{init}^1, t_{init}^1),\ldots,(S_{init}^K, t_{init}^K)\}$ on one or more charts.
Output: The distance maps $t^k: U^k \to \mathbb{R}^+$ for k = 1....,K.
1  Initialize the priority queue to Q = 0.
2  for k = 1....,K do
3     if $S_{init}^k \neq 0$ then set $t_{min}$ = min$\{t_{init}^k(u) : u \in S_{init}^k\}$, and add $(k, t_{min}, S_{init}^k, t_{init}^k)$ to the queue.
4  end
5  while Q ≠ 0 do
6     Set $(k, t_{min}, S_0, t_0)$ = argmin$\{t_{min} : (k, t_{min}, S_0, t_0) \in Q\}$, and remove it from the queue.
7     Run the single-chart raster scan algorithm to compute the distance map $t^k$ on $U^k$ using $t_0(S_0)$ as the source.
8     forall i ∈ $\mathscr{N}_k$ do
9        Set $\bar{t}_i = \mathscr{P}_{ki} t^k$.
10       forall u ∈ $\partial U^j \cap \partial U^k$ do
11          Set $t^i(u)$ = min$\{\bar{t}_j(u), t_i(u)\}$ for all u ∈ $\partial U^j$, and
12       end
13       Set $S_{upd}^i = \{u \in \partial U^j \cap \partial U^k : t_i(u) - \bar{t}_i(u) > \epsilon\}$, and update $t^i(u) = \bar{t}_i(u)$ on u ∈ $S_{upd}^i$.
14       if $S_{upd}^i \neq 0$ then compute $t_{min}^i$ = min$\{t^i(u) : u \in S_{upd}^i\}$:else set $t_{min}^i = \infty$.
15    end
16    Find i = argmin$\{t_{min}^i : i \in \mathscr{N}_k\}$.
17    if $t_{min}^i < \infty$ then set $S_0 = S_{init}^i \cup \partial U^j$, $t_0 = t_{init}^j(S_{init}^j) \cup t^i(\partial U^i)$, and add $(i, t_{min}^j, S_0, t_0)$ to the queue.
18 end

---

Each chart is associated with a quadruplet (k; t, $S_0$, $t_0$), where k=1, . . . , K is a chart index, and t is a scalar distance value, whose assignment is discussed in the sequel. $t_0$ denotes a set of fixed values on $S^0 \in U^k$, serve as boundary conditions.

Additionally, a distance map is maintained for each chart:

$$t^k: U^k \to \mathbb{R}^+$$

The algorithm maintains a priority queue Q holding as its entries the quadruplets (k; t, $S_0$, $t_0$). Similarly to the standard Dijkstra's algorithm, the queue is sorted according to t. Initially, the queue is filled with the source values given as the input.

desic can pass back and forth from one chart to another, resulting in multiple updates of both. However, the number of such repetitions is bounded under conditions similar to those stated in Proposition 1 hereinabove.

Distance Map Computation on a GPU

Modern GPUs are extremely powerful processors, capable of performing near trillions of operations (teraflop) per second. The reason for such high performance originates from the computation-hungry computer graphics applications, such as rendering and texture mapping.

We use the Compute Unified Device Architecture (CUDA) platform developed by NVIDIA. Similar results may be obtained by using the AMD platform [CTM].

For the sake of completeness, we briefly overview the most important features of CUDA. For a detailed implementation, CUDA's programming guide [CUD] may be used, as known in the art.

The G8X series GPUs, which supports CUDA have multiple independent processing units. When programmed using CUDA, the GPU is viewed as a processing unit capable of executing thousands of threads in parallel.

Both the CPU (referred to as host) and the GPU (referred to as device) maintain their own memory. Data can be transferred from one memory to another over the PCIe bus, yet the bandwidth of this bus (4 GB/sec) is significantly smaller compared to the bandwidth of internal buses on the GPU (100 GB/sec for the latest NVIDIA GPUs).

CUDA provide access to device DRAM memory either through global memory or texture memory. In addition, CUDA features on-chip shared memory with extremely fast general read/write access, used to share data between threads.

Texture memory is a read-only memory with a cache optimized for 2D spatial locality. The global memory is a read/write non-cached memory space. Access to device memory is relatively slow compared to the speed of arithmetic calculations, making GPUs especially suitable for programs with high arithmetic intensity (ratio between ALU and memory access operations) and potentially inefficient for those with a low one.

For example, the NVIDIA 8800GTX GPU can theoretically perform 345 Giga floating points operations per second, while having the memory bandwidth of only 86 Giga Bytes per second=22 Giga floats per second (when latency is completely hidden).

In order to get better utilization of the computational power of the GPU, and avoid the memory bandwidth bottleneck, memory access to device memory is minimized.

One way of doing so is by fetching a large portion of data from the global memory into shared memory (access to shared memory can be as fast as reading from a register) followed by as much as possible computations, and finally writing back the result to the global memory. The shared memory in this case can be thought of as user-managed cache.

Preferably, access to global memory is coherent, in a way that subsequent threads should access subsequent addresses in linear memory. There is no obligation to use such an access pattern. However, incoherent accesses may lead to extremely slow memory bandwidth.

Texture memory is more flexible in the sense that coherence is two-dimensional. However, texture memory is a read-only memory and there is no manual control over texture memory's caching scheme.

The architecture of the computational units in the GPU is single-program-multiple-data (SPMD), allowing to execute the same function independently on different data.

Functions executed in this way are called kernels.

The execution of a kernel is organized as a grid of thread blocks. A thread block is a batch of threads that can cooperate together by efficiently sharing data through fast shared memory and synchronizing their execution to coordinate memory accesses.

The maximum number of threads in a single thread block is limited. However, many thread blocks may be batched together into a grid of blocks that can be processed by the device in parallel.

It is important to note that communication and synchronization between threads of different thread blocks on the same grid is impossible. However, there may be imposed a global synchronization point on all threads by splitting work between separate kernel invocations.

A serious limitations of the device memory is the memory latency (currently, 400-600 cycles). Much of this latency may be hidden by the GPU thread scheduler if there are sufficient independent arithmetic instructions that may be issued while waiting for memory accesses to complete.

Thus, while some threads are stalled by memory latency, others may progress with Arithmetic-Logic Unit (ALU) calculations, provided there are enough threads waiting for execution. That is to say that a grid of thread blocks better contain as many as possible threads.

Although, CUDA is a significant step towards general purpose computing on GPUs, mapping a sequential algorithm from CPU to GPU is not trivial. Besides requiring a parallel version of the algorithm, certain restrictions have to be fulfilled fulfilled in order for the implementation to be efficient.

As described in further detail hereinabove, the update of an entire M on N grid is done in four subsequent scans (up, down, left and right). Each scan is further serialized into smaller parallel steps.

For example, the up scan is composed of M serialized steps. In each step, N vertices in a row are updated in parallel. The distance map is allocated in the global memory space as a read/write linear array of 32-bit floating point values.

The geometrical properties of the underling surface are stored in the read-only texture memory space.

Preferably, the coefficients used by the update scheme are calculated in a pre-processing stage and stored in the texture memory instead of the actual location of the vertices.

Optionally, each row or column of the grid is mapped to a certain single kernel call. Each thread in each thread block updates the distance at a single vertex according to the previous distance at that vertex and three distances of the vertices at the previous row/column, as described in further detail and illustrated using FIG. 8 hereinabove).

Kernel invocations serve as global synchronization point, such that the next row/column is processed only after the previous row/column is fully updated.

The memory access for the up and down scans are coherent, yet, the left/right scans use an incoherent memory access pattern, since the addresses of elements in a single column are far from each other in linear memory.

In order to overcome this limitation, the data may be organized in the following way: We allocate two different arrays to hold the distance maps. The first map is used solely for the up and down scans, while the second map is used solely for the left and right scans. The left/right map is stored in a transposed manner so we access both up/down and left/right distance maps on a row-by-row basis.

Since each scan depends on the result of the previous scan, we must copy the results obtained by the up and down scans from the up/down map to the left/right map. The task of copying the map in a transposed manner can be done efficiently with a single kernel invocation and without violating the coherence, as described in further detail hereinabove.

First there is decomposed the grid into smaller blocks that can fully reside in the shared memory. Then, each block is transposed separately, and is written in a coherent manner back to the global memory.

The proposed memory organization results in a better performance, but suffers from a bottleneck. Invoking a single kernel for each row/column in the grid leads to 2M+2N kernel invocations. A kernel invocation consumes a fixed overhead regardless of how many computations are done in that kernel (up to 20 msec per kernel).

For example, consider a grid with 3000 rows and 3000 columns. The total time for the kernel invocations alone is approximately (2×3000+2×3000)×20 microseconds=240 milliseconds. This time alone exceeds the total time of our optimized kernel computation by nearly an order of magnitude Preferably, there is used a kernel that processes a batch of rows rather than a single row at a time. Each batch is composed of a strip of $\Omega$ consecutive rows, such that the total number of kernel invocations is reduced by a factor of $\Omega$ to $(2M+2N)/\Omega$.

For each row in the strip, each thread fetches the former distance at that vertex from the distance map into the shared memory. The thread then calculates the updated distance at that vertex and writes the result back to the distance map.

All threads are then synchronized. Once all the threads reach the synchronization point, each thread may start working on the calculation of the next row in the strip.

Besides having the advantage of reduced number of kernel invocations, this access pattern also leads to higher arithmetic intensity, since for a large enough $\Omega$, a single fetch from the distance map per vertex is required (instead of four), since we can keep the computed distances of the previous row in the shared memory and do not need to read them again from global memory as we advance to the next row.

However, while communication through shared memory and synchronization between threads of the same thread block is possible, there is no synchronization mechanism between threads of different thread blocks. Since the maximum number of threads in a thread block is limited (512 on latest NVIDIA GPU), we are limited to small grids only.

Moreover, modern GPUs have several independent multiprocessors, working in parallel (16 on current NVIDIA GPU), and since each thread block can be processed by a single multiprocessor, the utilization of the hardware may be poor.

As illustrated using FIG. 8 hereinabove, a small portion of the distance map that is handled by a single thread block with 32 threads and W=8 rows.

Note that thread 0 is guaranteed to produce valid result only at row 0 since at any other row, the update depends on vertices which are located left to row 0. Values that come from the left cannot be trusted since they belong to a different thread block.

The potential errors on the first column may lead to errors on the second column as well (rows 2 to 7). In general, only the area shown in light gray in FIG. 8 may be considered a safe zone, as far as value is concerned.

An important observation is that we can still maintain consistent updates if we allow some partial overlap between subsequent thread blocks, such that each thread block updates vertices only in the safe zone.

Preferably, the blocks overlap in a way which brings each vertex of the grid to belong to at least one safe zone, as described in further detail hereinabove, and illustrated using FIG. 9.

FIG. 9 shows a small portion of the distance map covered by three overlapping blocks.

Note that some vertices belong to two safe zones. In order to avoid write conflicts, we demand that in such a case, only the block on the right may write the updated distance to the global memory. This write access pattern is illustrated in FIG. 9, where each vertex is updated by exactly one thread, which belongs one of the parallelograms.

The amount of redundancy that is introduced due to repetitions depends on the ratio between the number of threads in a single block and $\Omega$. In order to reduce the redundancy, W is preferably small for a fixed block size.

On the other hand, a larger value of $\Omega$ decreases the number of kernel invocations and improves the arithmetic intensity.

Thus a correct balance between the block size and $\Omega$ is a key to achieving good hardware utilization.

Another way to reduce the number of kernel invocations and increase the parallelism is to combine the four grid scans into a single scan. Performing several scans in parallel does not change the correctness of the algorithm since in the worse case, four iterations are needed in order to converge.

When a geodesic in the parameterization domain changes its direction smoothly from a zone affected by the up scan to a zone affected by the down scan, it must cross the left or right zones first.

For non-smooth geodesics with abrupt angles at some points, this holds, and additional iterations may be needed. Since this case is rare, we can safely combine the up and down scans into a single scan followed by another scan combining the left and right scans.

Numerical Results

In order to demonstrate the efficiency of the proposed algorithms, we consider its two particular implementations. In the one implementation, the PMM algorithm was implemented in C on an Intel Pentium platform, with the update step written in inline assembly and taking advantage of the SSE2 extensions (Intel SIMD architecture).

A second implementation was developed on an NVIDIA 8800GTX GPU with 768 MB memory using the CUDA environment. This GPU has 16 independent multiprocessors, each containing 8 processors. During fine-tuning of our code, we ran it on variable grid sizes $\{(64 k \times 64 k): k \in 1 \ldots 47\}$. For each grid, we measured performance on several block sizes and different values of W and recorded the configurations which minimized the running time.

In most runs, W=16 produced the best results. For relatively small grids (up to 768×768), a block size of 64 produced better results. The reason is that the use of large blocks leads to a small number of active blocks at any given time, hence, resulting in not all the GPU multiprocessors being active.

On large grids, a block size of 256 results in the best performance, reducing the amount of wasted computations to approximately 20%.

Note that even though the maximum block size is 512, configurations with too large blocks may lead to slower performance due to internal synchronization between threads in the same block or may even result in a non valid configuration for the hardware due to elimination of all hardware resources (registers, shared memory, etc.).

32-bit (single precision) floating point representation was used in both implementations. Pre-computation of geometry coefficients were excluded from time measurements (pre-computation on the GPU took around 9 ms of preprocessing time on the largest grid with 3008×3008 vertices).

Convergence

Reference is now made to FIG. 13, which is a simplified chart illustrating a first exemplary calculation of a distance map on a maze surface, according to a preferred embodiment of the present invention.

In a first example, a distance map is calculated for a maze surface with complicated spiral characteristics.

The dependence of the distance map accuracy on the number of iterations $N_{iter}$ is visualized in illustrated using FIG. 13, which shows the distance map computed from a single point source on the maze surface.

In the exemplary calculation, the calculation converges in six iterations, achieving the mean absolute error of 0.0024 of the shape diameter, and the mean relative error of 0.0058.

While multiple iterations are required to compute a converged distance map on the exemplary maze surface, a much smaller number of iterations are needed, to obtain accurate distance map on most manifolds.

Geodesic Paths, Offset Curves, and Voronoi Diagrams

Reference is now made to FIG. 14, which is a simplified chart illustrating exemplary calculations of a distance maps on a human face manifold, according to a preferred embodiment of the present invention.

Exemplary calculations of distance maps on a human face manifold, include, but are not limited to distance maps calculated, for finding equi-distance contours 1410—using marching triangles in a parameterization domain and projection back onto the manifold, minimal geodesic paths 1420—by backtracking a curve from a starting point along the gradient in the parameterization domain, geodesic veroni diagrams 1430—using marching triangles, and offset curves 1440—say distance map calculation from two disconnected curves and marching triangles.

Reference is now made to FIG. 15, which is a simplified chart illustrating an exemplary multi-grid calculation of a distance, according to a preferred embodiment of the present invention.

In an exemplary calculation of a distance map on a bumped torus 1500, there is applied a different grid on each of four parts of the bumped torus 1500.

The boundaries between the parts are presented as bold lines 1510. Each of the parts of the torus has a different level of detail.

Reference is now made to FIG. 16, which is a simplified chart illustrating progress of an exemplary multi-grid calculation of a distance map, according to a preferred embodiment of the present invention.

An exemplary multi-grid calculation of a distance map on the bumped torus 1510 presented in FIG. 15, starts by calculating a first distance map for the upper left part of the torus 1610, using a first grid applied on the upper left part 1610.

Distance values on the boundaries of the first distance map are extrapolated onto the neighboring lower left part 1620, in which a second distance map is calculated using a second (and different) grid, in the order of the minimal distance value on the boundary between the two parts 1610, 1620.

In a similar manner, the calculation progresses, by extrapolation of boundary distance values, from the upper left part 1610 to the upper right part 1630, and from the upper right part 1630, to the lower right part 1640.

Proof of Proposition 1

Convergence of the calculation of the distance map occurs after N iterations, if the distance map remains unchanged between iteration N−1 and N. This, in turn, happens when N−1 iterations are sufficient to cover any characteristic in the parameterization domain, as known in the art.

The number of iterations may therefore be bounded by the total variation of the tangential angle of a characteristic. Our proof generalizes [Qian et al. 2006], where a similar result was shown for the Euclidean case:

Let $\Gamma(s)$ be the characteristic curve with on the surface, s its arclength, and $\gamma(s)=(u^1(s);u^2(s))^T$ its parametrization in U. Since $\Gamma(s)=x(\gamma(s))$, using the chain rule we obtain:

$$\dot{\Gamma}=T\dot{\gamma}$$

$$\ddot{\Gamma}=T\ddot{\gamma}+r, \quad (32)$$

where the Hessian matrices of xi with respect to the parameterization coordinates u are:

$$r=(\dot{\gamma}^T H^1 \dot{\gamma}, \dot{\gamma}^T H^2 \dot{\gamma}, \dot{\gamma}^T H^3 \dot{\gamma})^T \text{ and } H^i = \nabla_{uu}^2 x^i$$

Since $\Gamma$ is geodesic and $\ddot{\Gamma}$ is normal to the surface:

$$0 = P_T \ddot{\Gamma} = T\ddot{\gamma} + P_T r, \quad (33)$$

where $P_T$ denotes the projection on the tangent space.
Hence:

$$\|T\ddot{\gamma}\| = \|P_T r\| \le \|r\| \le \sqrt{\left(\lambda_{min}^{H1}\right)^2 + \left(\lambda_{min}^{H2}\right)^2 + \left(\lambda_{min}^{H3}\right)^2} \cdot \|\dot{\gamma}\|, \quad (34)$$

where $\lambda_{min}^{H^i}$ is the smallest eigenvalue of the Hessian $H^i$.
Since is a geodesic, $\|\dot{\Gamma}\|=1$
From (32) we have:

$$1 = \|\dot{\Gamma}\|^2 = \dot{\gamma}^T T^T T \dot{\gamma} = \dot{\gamma}^T G \dot{\gamma} \ge \lambda_{min}^G \cdot \|\dot{\gamma}\|^2, \quad (35)$$

Hence:

$$1/\lambda_{max}^G \le \|\dot{\gamma}\|^2 \le 1/\lambda_{min}^G.$$

In a similar manner:

$$\|T\ddot{\gamma}\|^2 = \ddot{\gamma}^T T^T T \ddot{\gamma} = \ddot{\gamma}^T G \ddot{\gamma} \ge \lambda_{min}^G \cdot \|\ddot{\gamma}\|^2 \quad (36)$$

Combining the above results, yields a bound on the curvature of $\gamma$:

$$\kappa = \frac{\|\ddot{\gamma} \times \dot{\gamma}\|}{\|\dot{\gamma}\|^3} \le \frac{\|\ddot{\gamma}\|}{\|\dot{\gamma}\|^2} \le \frac{\lambda_{max}^G}{\lambda_{min}^G} \sqrt{\left(\lambda_{min}^{H1}\right)^2 + \left(\lambda_{min}^{H2}\right)^2 + \left(\lambda_{min}^{H3}\right)^2}. \quad (37)$$

$$TV(\phi) = \int_\gamma \kappa \, ds \le \max \kappa \cdot \int_\Gamma ds \le \max \kappa \cdot D. \quad (38)$$

which is the total variation the tangential angle of $\gamma$ is bounded by.

Thus, in the worst case, an iteration requires for every π/2 in TV (f) to consistently cover the characteristic $\gamma$, which completes the proof.

REFERENCES

ATI CTM Guide: Technical reference manual. Website: http://ati.amd.com/companyinfo/researcher/documents/ATI CTM Guide.pdf.

NVIDIA CUDA: Compute unified device architecture. Website: http://developer.nvidia.com/cuda.

SIGGRAPH 2007 GPGPU COURSE. Website: http://www.gpgpu.org/s2007.

BORNEMANN, F. AND RASCH, C. 2006. Finite-element discretization of static Hamilton-Jacobi equations based on a local variational principle. Computing and Visualization in Science 9, 2, 57-69.

BRONSTEIN, A. M., BRONSTEIN, A. M., AND KIMMEL, R. 2006a. Calculus of non-rigid surfaces for geometry and texture manipulation. IEEE Trans. Visualization and Comp. Graphics. to appear.

BRONSTEIN, A. M., BRONSTEIN, M. M., AND KIMMEL, R. 2006b. Generalized multidimensional scaling: a framework for isometry-invariant partial surface matching. Proc. National Academy of Sciences 103, 5 (January), 1168-1172.

CARR, N., HOBEROCK, J., CRANE, K., AND HART, J. Rectangular multi-chart geometry images. Geometry Processing 2006.

CHANG, K., BOWYER, K., AND FLYNN, P. 2003. Face recognition using 2D and 3D facial data. ACM Workshop on Multimodal User Authentication, 25-32.

DANIELSSON, P.-E. 1980. Euclidean distance mapping. Computer Graphics and Image Processing 14, 227-248.

DUPUIS, P. AND OLIENSIS, J. 1994. Shape from shading: Provably convergent algorithms and uniqueness results. In Proc. ECCV. 259-268.

ELAD, A. AND KIMMEL, R. 2001. Bending invariant representations for surfaces. In Proc. CVPR. 168-174.

FISCHER, I. AND GOTSMAN, C. 2005. Fast approximation of high order Voronoi diagrams and distance transforms on the GPU. Technical report CS TR-07-05, Harvard University.

FUNKHOUSER, T., KAZHDAN, M., SHILANE, P., MIN, P., KIEFER, W., TAL, A., RUSINKEWICZ, S., AND DOBKIN, D. 2004. Modeling by example. In Proc. SIGGRAPH. 652-663.

GU, X., GORTLER, S., AND HOPPE, H. 2002. Geometry images. ACM Transactions on Graphics 21, 3, 355-361.

HERSHBERGER, J. AND SURI, S. 1999. An optimal algorithm for Euclidean shortest paths in the plane. SIAM J. Computing 28, 6.

HILAGA, M., SHINAGAWA, Y., KOMURA, T., AND KUNII, T. L. 2001. Topology matching for fully automatic similarity estimation of 3D shapes. In Proc. SIGGRAPH. 203-212.

HOFF, K., CULVER, T., KEYSER, J., LIN, M., AND MANOCHA, D. 1999. Fast computation of generalized Voronoi diagrams using graphics hardware. In Proc. ACM SIGGRAPH. 277-286.

KATZ, S. AND TAL, A. 2004. Hierarchical mesh decomposition using fuzzy clustering and cuts. ACM Trans. on Graphics 22, 3 (July), 954-961.

KIMMEL, R. AND SETHIAN, J. A. 1998. Computing geodesic paths on manifolds. Proc. of National Academy of Sciences 95, 15, 8431-8435.

M'E MOLI, F. AND SAPIRO, G. 2001. Fast computation of weighted distance functions and geodesics on implicit hyper-surfaces. Journal of Computational Physics 173, 1, 764-795.

M'E MOLI, F. AND SAPIRO, G. 2005. A theoretical and computational framework for isometry invariant recognition of point cloud data. Foundations of Computational Mathematics 5, 3, 313-347.

MITCHELL, J. S. B., MOUNT, D. M., AND PAPADIMITRIOU, C. H. 1987. The discrete geodesic problem. SIAM Journal of Computing 16, 4, 647-668.

NOVOTNI, M. AND KLEIN, R. 2002. Computing geodesic distances on triangular meshes. In Proc. Intl. Conf. in Central Europe on Computer Graphics, Visualization and Computer Vision (WSCG'2002).

PEYR'E, G. AND COHEN, L. 2003. Geodesic re-meshing and parameterization using front propagation. In Proc. VLSM'03.

PRAUN, E., HOPPE, H., AND FINKELSTEIN, A. 1999. Robust mesh watermarking. In Proc. SIGGRAPH. 49-56.

QIAN, J., ZHANG, Y., AND ZHAO, H. 2006. Fast sweeping methods for eikonal equations on triangulated meshes. SIAM Journal on Numerical Analysis. to appear.

SETHIAN, J. AND POPOVICI, A. 2006. 3-d travel time computation using the fast marching method. Geophysics 64, 2, 516-523.

SETHIAN, J. A. 1996. A fast marching level set method for monotonically advancing fronts. Proc. of National Academy of Sciences 93, 4, 1591-1595.

SETHIAN, J. A. AND VLADIMIRSKY, A. 2000. Fast methods for the Eikonal and related Hamilton-Jacobi equations on unstructured meshes. PNAS 97, 11, 5699-5703.

SIGG, C., PEIKERT, R., AND GROSS, M. 2003. Signed distance transform using graphics hardware. In Proc. IEEE Visualization. 83-90.

SLOAN, P.-P. J., ROSE, C. F., AND COHEN, M. F. 2001. Shape by example. In ACM Symposium on Interactive 3D Graphics. 133-144.

SPIRA, A. AND KIMMEL, R. 2004. An efficient solution to the eikonal equation on parametric manifolds. Interfaces and Free Boundaries 6, 4, 315-327.

SUD, A., GOVINDARAJU, N., GAYLE, R., AND MANOCHA, D. 2006. Interactive 3D distance field computation using linear factorization. In Proc. ACM Symposium on Interactive 3D Graphics and Games. 117-124.

SURAZHSKY, V., SURAZHSKY, T., KIRSANOV, D., GORTLER, S., AND HOPPE, H. 2005. Fast exact and approximate geodesics on meshes. In Proc. SIGGRAPH. 553-560.

TSITSIKLIS, J. N. 1995. Efficient algorithms for globally optimal trajectories. IEEE Transactions on Automatic Control 40, 9, 1528-1538.

YING, L. AND CAND'ES, E. J. 2006. The phase flow method. Journal of Computational Physics 220, 184-215.

ZHAO, H. 2004. A fast sweeping method for eikonal equations. Mathematics of computation 74, 250, 603-627.

ZHOU, K., SNYDER, J., GUO, B., AND SHUM, H.-Y. 2004. Iso-charts: Stretch-driven mesh parameterization using spectral analysis. In Symposium on Geometry Processing.

ZIGELMAN, G., KIMMEL, R., AND KIRYATI, N. 2002. Texture mapping using surface flattening via multi-dimensional scaling. IEEE Trans. Visualization and computer graphics 9, 2, 198-207.

It is expected that during the life of this patent many relevant devices and systems will be developed and the scope of the terms herein, particularly of the terms ""GPU", "SPMD", and "Computer", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed:

1. A method for parallel approximation of distance maps on a discrete representation of a single manifold, the method comprising:
    determining a plurality of characteristics of the manifold;
    applying a plurality of Euclidean grids over the manifold according to said characteristics; for each Euclidean grid applied on the discrete representation of a manifold, iterating over rows of said Euclidean grid in a first direction; and for each row currently visited during said iterating in said first direction, calculating a distance value using a Graphical Processing Unit (GPU) for each single cell of said currently visited row in parallel, wherein said calculating is carried out according to a predefined approximation rule, using a distance value calculated for each one of respective cells of a single row visited immediately before said currently visited row, wherein said cells of said single row visited before said currently visited row are adjacent to said single cell in said Euclidean grid; and determining the distance map according to said plurality of Euclidean grids.

2. The method of claim 1, further comprising a preliminary step of applying said plurality of Euclidean grids on the discrete representation of said single manifold.

3. The method of claim 1, wherein said Euclidean grids comprise a plurality of different Euclidean grids, and each grid is applied on a respective portion of the discrete representation of said single manifold according to said characteristics of said manifold.

4. The method of claim 1, further comprising: in a second direction, iterating over rows of said Euclidean grid; and for each row currently visited during said iterating in said second direction, calculating a distance value for each single cell of said currently visited row in parallel, wherein said calculating is carried out according to said predefined approximation rule, using a distance value calculated for each one of respective cells of a row visited immediately before said currently visited row, wherein said cells of said row visited before said currently visited row are adjacent to said single cell in said Euclidean grid.

5. The method of claim 4, wherein said iterating in said second direction is carried out in parallel to said iterating in said first direction.

6. The method of claim 4, further comprising: in a third direction, iterating over columns of said Euclidean grid; and for each column currently visited during said iterating in said third direction, calculating a distance value for each single cell of said currently visited column in parallel, wherein said calculating is carried out according to said predefined approximation rule, using a distance value calculated for each one of respective cells of a column visited immediately before said currently visited column, wherein said cells of said column visited before said currently visited column are adjacent to said single cell in said Euclidean grid.

7. The method of claim 6, further comprising: in a fourth direction, iterating over columns of said Euclidean grid; for each column currently visited during said iterating in said fourth direction, calculating a distance value for each single cell of said currently visited column in parallel, wherein said calculating is carried out according to said predefined approximation rule, using a distance value calculated for each one of respective cells of a column visited immediately before said currently visited column, wherein said cells of said column visited before said currently visited column are adjacent to said single cell in said Euclidean grid.

8. The method of claim 7, wherein said iterating in said fourth direction is carried out in parallel to said iterating in said third direction.

9. The method of claim 1, wherein said predefined approximation rule comprises a Fast Marching based update scheme or said predefined approximation rule comprises a predefined geometric scheme or both.

10. The method of claim 1, further comprising automatically calculating geometrical parameters for said Euclidean grid, wherein said predefined geometric scheme involves said calculated geometrical parameters for said plurality of characteristics.

11. The method of claim 1, wherein said iterating and said calculating are carried out using a Graphical Processing Unit (GPU).

12. The method of claim 11, further comprising assigning each of at least two portions of said Euclidean grid to a respective kernel of said Graphical Processing Unit (GPU).

13. The method of claim 1, wherein said manifold is an image or a parametric surface or a three-dimensional volume.

14. An apparatus for parallel approximation of distance maps on a discrete representation of a manifold, the apparatus comprising: an iterator, configured for a plurality of Euclidean grids applied on the discrete representation of a manifold, to iterate over rows of said Euclidean grids in a plurality of directions, wherein said Euclidean grids are two-dimensional grids; and a distance value calculator, associated with said iterator, and configured for each row currently visited during said iterating in said plurality of directions, to calculate a distance value for each single cell of said currently visited row in parallel, wherein said calculating is carried out according to a predefined approximation rule only using a distance value calculated for each one of respective cells of a single row visited immediately before said currently visited row, wherein said cells of said single row visited before said currently visited row are adjacent to said single cell in said Euclidean grids; wherein said grid applier is further configured to apply said Euclidean grids on the discrete representation of a manifold, wherein said Euclidean grids comprise a plurality of different Euclidean grids, each one of said Euclidean grids being applied on a respective portion of the discrete representation of a manifold and wherein distances for said plurality of grids are combined to form said distance map.

15. The apparatus of claim 14, further comprising a grid applier, associated with said iterator, and configured to apply said Euclidean grid on the discrete representation of a manifold.

16. The apparatus of claim 14, wherein said iterator is further configured to iterate in a second direction in parallel to iterating in a first direction.

17. The apparatus of claim 14, wherein said predefined approximation rule comprises a Fast Marching based update scheme.

18. The apparatus of claim 14, wherein said predefined approximation rule comprises a predefined geometric scheme.

19. The apparatus of claim 18, wherein said distance value calculator is further configured to automatically calculate geometrical parameters for said Euclidean grid, and said predefined geometric scheme involves said calculated geometrical parameters.

20. The apparatus of claim 14, wherein said distance value calculator is implemented on a Graphical Processing Unit (GPU).

21. The apparatus of claim 20, further comprising a portion assigner, associated with said iterator, and configured to assign each of at least two portions of said Euclidean grid to a respective kernel of said Graphical Processing Unit (GPU).

22. A method for parallel approximation of distance maps on a discrete representation of a manifold, the method comprising: for a plurality of Euclidean grids applied on the discrete representation of a manifold, iterating over rows of each of said Euclidean grids in a plurality of directions, wherein said Euclidean grids are two-dimensional grids; and for each row currently visited during said iterating in each of said plurality of directions, calculating a distance value using a Graphical Processing Unit (GPU) for each single cell of said currently visited row in parallel, wherein said calculating is carried out according to a predefined approximation rule, only using a distance value calculated for each one of respective cells of a single row visited immediately before said currently visited row, wherein said cells of said single row visited before said currently visited row are adjacent to said single cell in said Euclidean grid.

23. The method of claim 22, wherein said iterating over said rows of said Euclidean grid in said plurality of directions comprises traversing said plurality of directions such that each direction is rotated with respect to each other direction.

24. The method of claim 23, wherein said plurality of directions comprises four directions, such that each direction is rotated with respect to each other direction by 45 degrees.

* * * * *